(12) United States Patent
Wang et al.

(10) Patent No.: US 12,513,227 B2
(45) Date of Patent: Dec. 30, 2025

(54) METHOD FOR CONTROL PROTOCOL FRAME TRANSMISSION AND ELECTRONIC DEVICE

(71) Applicant: SK hynix Inc., Icheon-si (KR)

(72) Inventors: Lan Feng Wang, Zhubei (TW); Wen Jyh Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 7 days.

(21) Appl. No.: 18/482,678

(22) Filed: Oct. 6, 2023

(65) Prior Publication Data

US 2024/0121323 A1    Apr. 11, 2024

Related U.S. Application Data

(60) Provisional application No. 63/415,166, filed on Oct. 11, 2022.

(30) Foreign Application Priority Data

Oct. 4, 2023    (TW) .................................. 112138151

(51) Int. Cl.
*H04L 69/04* (2022.01)
*H04L 27/04* (2006.01)

(52) U.S. Cl.
CPC .............. *H04L 69/04* (2013.01); *H04L 27/04* (2013.01)

(58) Field of Classification Search
CPC ................................ H04L 69/04; H04L 27/04
USPC .................................. 375/257, 259, 295, 300
See application file for complete search history.

(56) References Cited

U.S. PATENT DOCUMENTS

| | | |
|---|---|---|
| 5,579,476 A | 11/1996 | Cheng et al. |
| 6,415,313 B1 | 7/2002 | Yamada et al. |
| 6,880,111 B2 | 4/2005 | Fanning |
| 7,376,917 B1 | 5/2008 | Lazarut et al. |
| 8,644,148 B2 | 2/2014 | Balandin et al. |
| 8,830,877 B2 | 9/2014 | Jin et al. |
| 9,622,111 B2 | 4/2017 | Park |
| 9,727,501 B2 | 8/2017 | Gowravaram et al. |
| 9,998,890 B2 | 6/2018 | Marko |
| 10,039,099 B2 | 7/2018 | Sato et al. |
| 10,075,566 B2 | 9/2018 | Lee et al. |
| 10,154,402 B2 | 12/2018 | Agiwal et al. |
| 10,254,972 B2 | 4/2019 | Iwai et al. |

(Continued)

FOREIGN PATENT DOCUMENTS

| | | | |
|---|---|---|---|
| KR | 1020140091719 A1 | | 7/2014 |
| WO | 2022078426 A1 | | 4/2022 |

*Primary Examiner* — Emmanuel Bayard
(74) *Attorney, Agent, or Firm* — WILLIAM PARK AND ASSOCIATES LTD.

(57) ABSTRACT

Method for control protocol frame transmission and electronic device are provided. The method comprises following operations. By the electronic device operating in an advanced line encoding mode and having a first burst from the electronic device to the other electronic device, the first burst is closed and a second burst is opened from the electronic device to the other electronic device for request frame transmission, wherein the electronic device operating in the advanced line encoding mode is configured to transmit data by using an advanced line encoding having an effective data rate larger than an effective data rate of 8b/10b encoding. By the electronic device, a request frame is transmitted in the second burst.

19 Claims, 27 Drawing Sheets

(56) References Cited

U.S. PATENT DOCUMENTS

| | | | |
|---|---|---|---|
| 10,534,034 B2 | 1/2020 | Froelich et al. | |
| 10,587,362 B2 | 3/2020 | Rico Alvarino et al. | |
| 10,606,710 B2 | 3/2020 | Kim et al. | |
| 10,630,410 B2 | 4/2020 | Parkvall et al. | |
| 10,686,472 B2 | 6/2020 | Hosseini et al. | |
| 10,700,810 B2 | 6/2020 | Pandey | |
| 10,812,229 B2 | 10/2020 | Han et al. | |
| 10,834,661 B2 | 11/2020 | Joseph et al. | |
| 10,873,429 B1 | 12/2020 | Kwon et al. | |
| 11,070,259 B2 | 7/2021 | Manolakos et al. | |
| 11,336,445 B2 | 5/2022 | Anslot et al. | |
| 11,419,004 B2 | 8/2022 | Ramos | |
| 11,444,721 B2 | 9/2022 | Li et al. | |
| 11,546,087 B2 | 1/2023 | Jeong et al. | |
| 11,687,420 B2 | 6/2023 | Lin et al. | |
| 11,722,469 B2 | 8/2023 | Kravitz et al. | |
| 11,770,844 B2 | 9/2023 | Zhou et al. | |
| 11,847,459 B2 | 12/2023 | Agarwal et al. | |
| 11,943,053 B2 | 3/2024 | Chen et al. | |
| 12,237,919 B2 | 2/2025 | Zheng et al. | |
| 12,356,201 B2 | 7/2025 | Wei et al. | |
| 12,363,043 B2 | 7/2025 | Mate et al. | |
| 12,396,023 B2 | 8/2025 | Yi et al. | |
| 12,414,172 B2 | 9/2025 | Gupta | |
| 2008/0285678 A1* | 11/2008 | Karaki | H04L 1/0084 375/295 |
| 2010/0165896 A1* | 7/2010 | Gong | H04W 52/0216 370/311 |
| 2011/0066921 A1 | 3/2011 | Blackmon et al. | |
| 2011/0076953 A1 | 3/2011 | Macrae | |
| 2012/0120960 A1* | 5/2012 | Nishioka | H04L 12/40013 370/392 |
| 2013/0061099 A1 | 3/2013 | Radulescu | |
| 2013/0179628 A1* | 7/2013 | Sekiya | G06F 13/385 711/E12.008 |
| 2013/0227509 A1 | 8/2013 | Chang et al. | |
| 2016/0246667 A1 | 8/2016 | Kumar Rao | |
| 2016/0364309 A1 | 12/2016 | Park et al. | |
| 2017/0093521 A1* | 3/2017 | Wang | H04L 1/0009 |
| 2017/0220517 A1* | 8/2017 | Khan | H04B 1/40 |
| 2017/0286357 A1 | 10/2017 | Chellappan et al. | |
| 2018/0132263 A1 | 5/2018 | Nuggehalli et al. | |
| 2019/0052736 A1 | 2/2019 | Turtinen et al. | |
| 2019/0182809 A1 | 6/2019 | Liu et al. | |
| 2019/0191330 A1 | 6/2019 | Dao et al. | |
| 2020/0081646 A1 | 3/2020 | Byun et al. | |
| 2020/0082891 A1 | 3/2020 | Lee et al. | |
| 2020/0192856 A1 | 6/2020 | Lee et al. | |
| 2020/0356519 A1 | 11/2020 | Ballantyne et al. | |
| 2020/0379833 A1 | 12/2020 | Hsiao et al. | |
| 2022/0294476 A1* | 9/2022 | Seol | H04L 25/4917 |
| 2023/0056001 A1 | 2/2023 | Lin | |
| 2023/0133677 A1 | 5/2023 | Sun et al. | |
| 2023/0188256 A1 | 6/2023 | Yu et al. | |
| 2023/0239073 A1 | 7/2023 | Bharadwaj et al. | |
| 2023/0269311 A1 | 8/2023 | Liu | |
| 2023/0377618 A1 | 11/2023 | Lin | |
| 2023/0396360 A1 | 12/2023 | Zhang et al. | |
| 2024/0014943 A1 | 1/2024 | Kuo et al. | |
| 2024/0089236 A1 | 3/2024 | Li et al. | |
| 2024/0121326 A1 | 4/2024 | Lin | |
| 2024/0340322 A1 | 10/2024 | Bouazizi et al. | |
| 2024/0397399 A1 | 11/2024 | Gupta et al. | |
| 2025/0047400 A1 | 2/2025 | Peyla et al. | |
| 2025/0097954 A1 | 3/2025 | Sengupta et al. | |
| 2025/0142440 A1 | 5/2025 | Lee et al. | |
| 2025/0158765 A1 | 5/2025 | Echigo et al. | |

* cited by examiner

METHOD FOR CONTROL PROTOCOL FRAME TRANSMISSION AND ELECTRONIC DEVICE

CROSS-REFERENCE TO RELATED APPLICATION

This non-provisional application claims the benefit under 35 U.S.C. § 119(e) of U.S. Provisional Patent Application No. 63/415,166 filed on Oct. 11, 2022, and claims priority under 35 U.S.C. § 119(a) to Taiwanese Patent Application No. 112138151 filed on Oct. 4, 2023, in the Taiwan Intellectual Property Office, the entire contents of which are hereby incorporated by reference.

BACKGROUND OF THE INVENTION

1. Field of the Invention

The present disclosure relates to circuit, controllers, and methods for control protocol frame transmission for an electronic device, and in particular to circuits, controllers, and methods for control protocol frame transmission for an interconnection protocol capable of performing an advanced line encoding, and an electronic device therefor such as a host device or a storage device.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard includes a local host and a remote device, wherein the local host may be a computing device and the remote device may be a storage device implemented by a non-volatile memory, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing a line coding scheme having an improved effective data rate are provided, and are suitable for an electronic device capable of communicating with another electronic device according to the interconnection protocol.

Embodiments of a method for control protocol frame transmission for an electronic device capable of communicating with another electronic device are provided. The method comprising following operations. By a controller of the electronic device operating in an advanced line encoding mode and having a first burst from the electronic device to the other electronic device, the first burst is closed and a second burst is opened from the electronic device to the other electronic device for request frame transmission, wherein the electronic device operating in the advanced line encoding mode is capable of data transmission by using an advanced line encoding having an effective data rate larger than an effective data rate of 8b/10b encoding. By the controller of the electronic device, a request frame is transmitted in the second burst.

Embodiments of an electronic device configured to communicate with another electronic device are provided. The electronic device can be implemented as a host device or storage device. The electronic device comprises a controller which includes a physical layer circuit for signal transmission and a link controller coupled to the physical layer circuit. When the electronic device operates in an advanced line encoding mode and has a first burst from the electronic device to the other electronic device, the controller closes the first burst and opens a second burst from the electronic device to the other electronic device for request frame transmission, and transmits a request frame in the second burst, wherein the electronic device operating in the advanced line encoding mode is capable of data transmission by using an advanced line encoding having an effective data rate larger than an effective data rate of 8b/10b encoding.

Embodiments of a method for control protocol frame transmission for an electronic device capable of communicating with another electronic device are provided. The method comprising following operations. By the electronic device operating in an advanced line encoding mode and having a first burst from the electronic device to the other electronic device, in response to a request frame from the other electronic device, the first burst is closed and a second burst from the electronic device to the other electronic device is opened for confirmation frame transmission, wherein the electronic device operating in the advanced line encoding mode is capable of data transmission by using an advanced line encoding having an effective data rate larger than an effective data rate of 8b/10b encoding. By the electronic device, in response to the request frame from the other electronic device, a confirmation frame is transmitted in the second burst to the other electronic device.

Embodiments of an electronic device configured to communicate with another electronic device are provided. The electronic device can be implemented as a host device or storage device. The electronic device comprises a controller which includes a physical layer circuit for signal transmission and a link controller coupled to the physical layer circuit. When the electronic device operates in an advanced line encoding mode and has a first burst from the electronic device to the other electronic device, the controller, in response to a request frame from the other electronic device, closes the first burst and opens a second burst from the electronic device to the other electronic device for confirmation frame transmission, and transmits a confirmation frame in the second burst to the other electronic device, wherein the electronic device operating in the advanced line encoding mode is capable of data transmission by using an advanced line encoding having an effective data rate larger than an effective data rate of 8b/10b encoding.

DETAILED DESCRIPTION OF THE INVENTION

Figure 1:
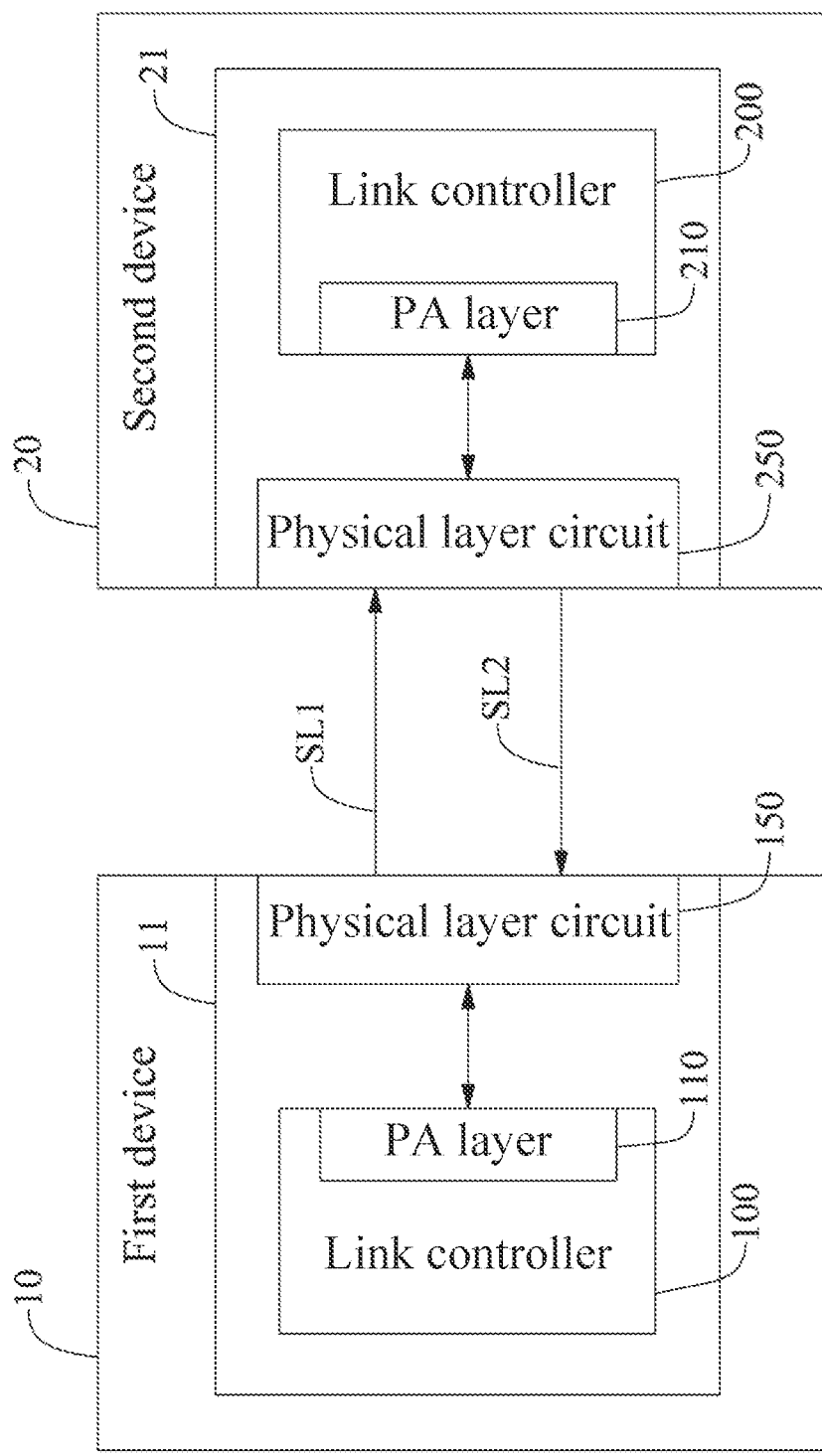
FIG. 1 is a diagram illustrating an embodiment of a communication system capable of communication according to an interconnection protocol in an advanced line encoding mode.

To facilitate understanding of the object, characteristics and effects of this present disclosure, embodiments together with the attached drawings for the detailed description of the present disclosure are provided.

In the present disclosure, the inventor proposes an interconnection protocol with an advanced line coding scheme. The advanced line coding scheme hereafter is referred to as Advance Line Encode or advanced line encoding (ALE) which indicates a line coding scheme having an effective data rate larger than an effective data rate of 8b/10b coding scheme. For example, line coding schemes such as a 1b/1b, 128b/129b, 128b/130b, 128b/132b, 256b/257b, 256b/258b, or 256b/260b coding scheme, or so on, have reduced overhead, as compared to 8b/10b coding scheme, and thus have effective data rates larger than an effective data rate of 8b/10b coding scheme. As an example, in a 128b/130b coding scheme, every 128-bit payload data is converted to 130-bit "block" to be transmitted and the 128b/130b coding has 1.54% overhead and an effective data rate of 98.46% accordingly. Likewise, in other examples, 1b/1b, 128b/129b, 128b/132b, 256b/257b, 256b/258b, or 256b/260b coding scheme or so on can be implemented as an advanced line encoding scheme.

The interconnection protocol can be derived from the UFS standard, UniPro specification, or so on. The interconnection protocol can also be regarded as a proposed or enhanced version of the UFS standard or UniPro specification in the future. The advanced line coding can be implemented in the interconnection protocol as an advanced operation mode, or referred to as an advanced line encoding (ALE) mode, which indicates that an electronic device compliant with the interconnection protocol is capable of data transmission by using an advanced line encoding scheme.

In the present disclosure, error recovery operations for physical adapter control protocol (PACP) frame re-transmission (or replay) in the advanced line encoding mode are concerned in order to facilitate implementation of the advanced line encoding mode. Embodiments of PACP Frame replay operations which are obtained by modification of the current UniPro specification are provided below to facilitate implementation of enhanced line coding scheme. The PACP Frame re-transmission operations can also be adopted in further derivations of the interconnection protocol.

In the advanced line encoding mode, a signaling scheme for transmission of bits different from conventional signaling schemes (such as Non-Return-to-Zero (NRZ) or Pulse Width Modulation (PWM)) available in the current UFS standard, may be further adopted in conjunction with the advanced line encoding scheme to enhance overall data throughput. For example, multi-level signaling schemes for bits transmission such as pulse amplitude modulation (PAM) n-level (PAM-n) can be adopted together with the advanced line encoding scheme, wherein n is an integer greater than 2, such as 3, 4, 5, 6, 8, or 16. The embodiments of PACP Frame replay operations which are obtained by modification of the current UniPro specification can also facilitate implementation of an advanced line encoding scheme in conjunction with the signaling scheme such as PAM-4 or so on.

Various embodiments are provided below for facilitating the interconnection protocol based on the ALE, and are suitable for an electronic device capable of communicating with another electronic device according to the interconnection protocol.

As mentioned above, the interconnection protocol with the ALE can be derived from the UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol with the ALE can be implemented and derived from architecture of the conventional UFS system by using a modified UFS system implementing a modified version of UniPro and a modified version of M-PHY for the ALE. Further, the interconnection protocol with the ALE can also be implemented in a communication system including a host and a device each having respective link layer (such as a modified version of UniPro) and respective physical layer (such as a modified version of M-PHY) both compliant with the ALE.

FIG. 1 is a diagram illustrating an embodiment of a communication system capable of communication according to an interconnection protocol in an advanced line encoding mode. The communication system, which can be a modified UFS system or based on a modified UniPro specification, for example, includes a first device 10 and a second device 20, which can be a local host and a remote device respectively, or vice versa. In FIG. 1, the first device 10 includes a link controller 100 and a physical layer circuit 150, which may be implemented as a controller 11. Likewise, the second device 20 includes a link controller 200 and a physical layer circuit 250, which may be implemented as a controller 21. The link controller 100 of the first device 10 for example implements a protocol layer (or "link layer") such as a modified UniPro including a physical adapter (PA) layer 110; and likewise, the link controller 200 of the second device 20 for example also implements the protocol layer (or "link layer") such as a modified UniPro including a physical adapter (PA) layer 210. The first device 10 is capable of communicating with the second device 20 via a link including at least one data lane SL1 and at least one data lane SL2, which are bidirectional, according to the interconnection protocol. The interconnection protocol is applicable to a wide range of devices (e.g., for first device or second device) such as application processors, co-processors, modems, storage subsystems including non-volatile memory modules, displays, camera sensors, 3D graphics and multimedia accelerators, chips, and so on. It is also applicable to different types of data traffic such as control messages, bulk data transfer and packetized streaming. Other MIPI alliance specifications can also be used for implementation of the physical layer and application layer.

For example, the first device 10 and the second device 20 communicate through bursts opened (or referred to as started) on respective data lanes (or simply called lanes). In terms of signal transmission, a burst indicates a data sequence, which includes a start-of-burst (SOB), data to be transmitted, and a tail-of-burst (TOB). For example, the SOB can be a specific bit pattern or signal level pattern which indicates a start of a burst and the data can be transmitted after the SOB. A burst from the first device 10 to the second device 20 can be opened (or started) on a data lane (e.g., SL1) by a transmitter module (e.g., transmitter 1111 in FIG. 9) of the physical layer circuit 150 sending an SOB to a receiver module (e.g., receiver 1212 in FIG. 9) of the physical layer circuit 250. After the receiver module of the physical layer circuit 250 receives and detects the SOB, both the first device 10 and the second device 20 can enter a burst state. In terms of operation states of the transmitter or receiver module, the burst state is a state in which data transmission and reception can be performed effectively. In an advanced line encoding mode according to the interconnection protocol, the first device 10 is capable of transmitting data to the second device 20 in the burst, wherein the data may be a physical adapter control protocol (PACP) frame, a data link (DL) layer frame, or so on. The first device 10 can further close (or end) the burst by sending a TOB. The TOB is another specific bit pattern or signal level pattern, which indicates a tail of the burst so that both the first device 10 and the second device 20 exit the burst state and enter a power saving state. In the similar manners as mentioned above, a burst from the second device 20 to the first device 10 can be opened (or started) by a transmitter module (e.g., transmitter 1211 in FIG. 9) of the physical layer circuit 250 sending a SOB to a receiver module (e.g., receiver 1112 in FIG. 9) of the physical layer circuit 150 on a data lane (e.g., SL2); data transmission and reception can be performed in the burst effectively; and the burst can be closed. In addition, a SOB or TOB of a burst can be implemented based on related portions described in the M-PHY specification (e.g., M-PHY version 5.0), for example. In some embodiments, any data pattern or signal level pattern for a SOB or TOB can be used, whenever appropriate, as long as both the transmitter and receiver modules are consistent in adopting the pattern.

In the present disclosure, error recovery operations for physical adapter control protocol (PACP) frame re-transmission (or replay) in the advanced line encoding mode are concerned in order to facilitate implementation of the advanced line encoding mode. Various embodiments for facilitating implementation of error recovery in the advanced line encoding mode are provided below.

Figure 2:
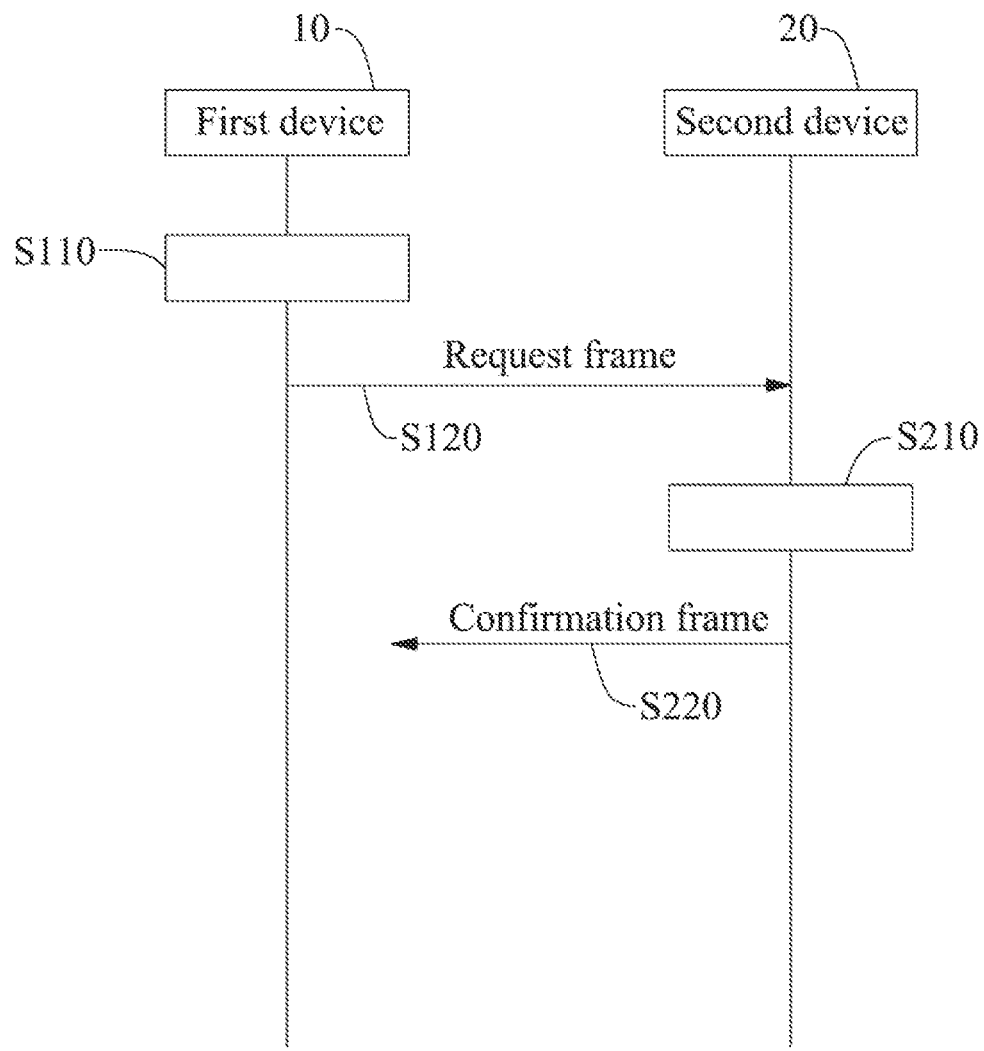
FIG. 2 is a diagram illustrating an embodiment of an operation flow of control protocol frame transmission in an advanced line encoding mode.

FIG. 2 is a diagram illustrating an embodiment of an operation flow of control protocol frame transmission in an advanced line encoding mode.

In operation S110, by the first device 10 operating in an advanced line encoding mode and having a first burst (e.g., denoted by BA1) from the first device 10 to the second device 20 (or called the first burst for the first device 10), the first burst BA1 is closed and a second burst (e.g., denoted by BA2) is opened from the first device 10 to the second device 20 for request frame transmission. The first device 10 operating in the advanced line encoding mode is capable of data transmission by using an advanced line encoding having an effective data rate larger than an effective data rate of 8b/10b encoding.

In operation S120, by the first device 10, a request frame is transmitted in the second burst BA2.

In operation S210, by the second device 20 operating in an advanced line encoding mode and having a first burst (e.g., denoted by BB1) from the second device 20 to the first device 10 (or called the first burst for the second device 20), in response to a request frame from the first device 10, the first burst BB1 is closed and a second burst (e.g., denoted by BB2) is opened from the second device 20 to the first device 10. The second device 20 operating in the advanced line encoding mode is capable of data transmission by using an advanced line encoding having an effective data rate larger than an effective data rate of 8b/10b encoding.

In operation S220, by the second device 20, in response to the request frame from the first device 10, a confirmation frame is transmitted in the second burst BB2 to the first device 10.

In FIG. 2, reliability of the control protocol frame transmission with respect to request frames or confirmation frames is enhanced because the request frame or confirmation frame is transmitted in a respective new burst.

Figure 3A:
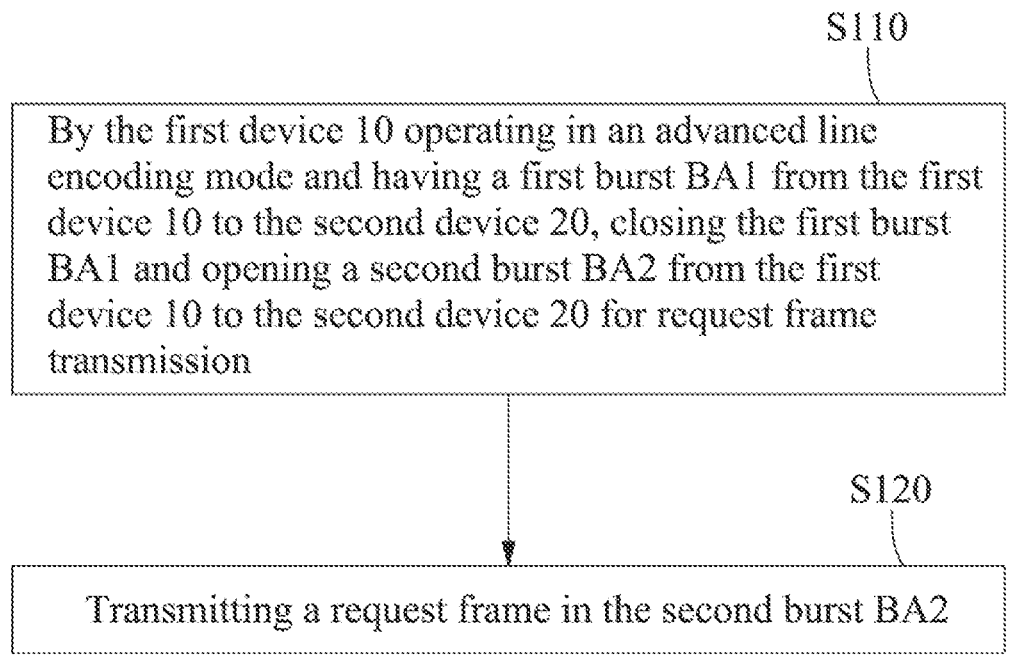
FIG. 3A is a flowchart illustrating an embodiment of a method for control protocol frame transmission with respect to request frames according to FIG. 2.

FIG. 3A is a flowchart illustrating an embodiment of a method for control protocol frame transmission with respect to request frames according to FIG. 2. The method of FIG. 3A includes the operations S110 and S120 and is provided for the first device 10 to enhance reliability of control protocol frame transmission with respect to request frames.

Figure 3B:
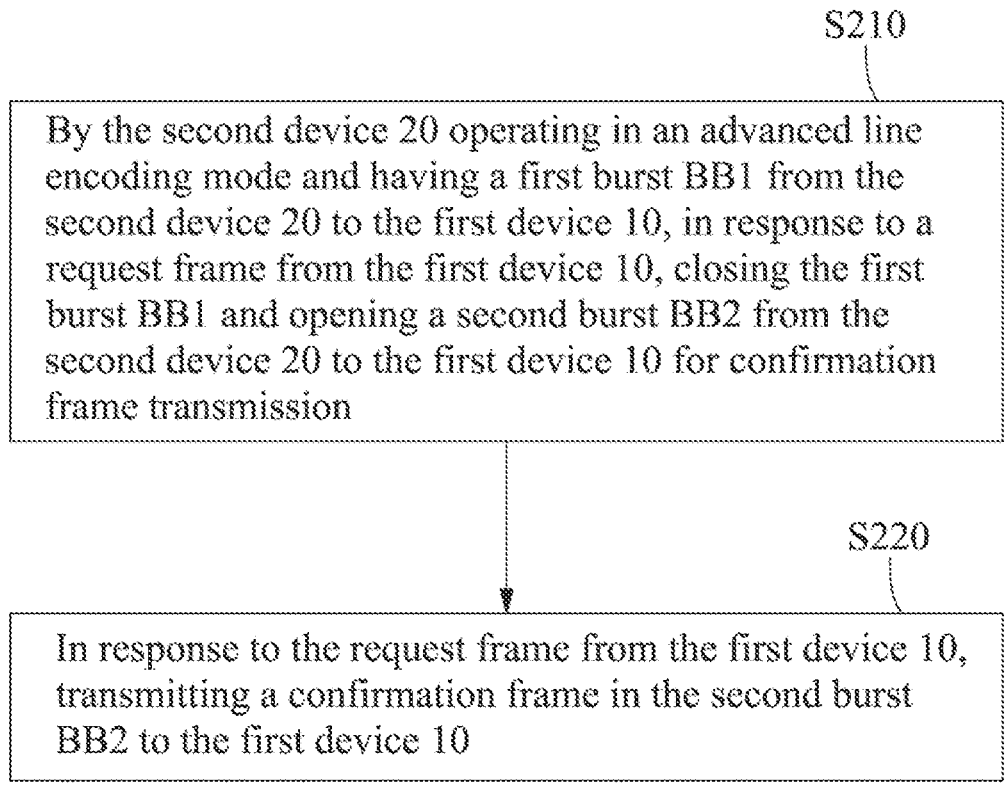
FIG. 3B is a flowchart illustrating an embodiment of a method for control protocol frame transmission with respect to confirmation frames according to FIG. 2.

FIG. 3B is a flowchart illustrating an embodiment of a method for control protocol frame transmission with respect to confirmation frames according to FIG. 2. The method of FIG. 3B includes the operations S210 and S220 and is provided for the second device 20 to enhance reliability of control protocol frame transmission with respect to confirmation frames.

Further, the first device 10 can proceed with an associated procedure of the interconnection protocol with respect to the request frames or confirmation frames if the confirmation frame of the operation S220 is successfully received by the first device 10. In a situation where the confirmation frame is not received by the first device 10 within a time interval, a frame error recovery is required.

Figure 4:
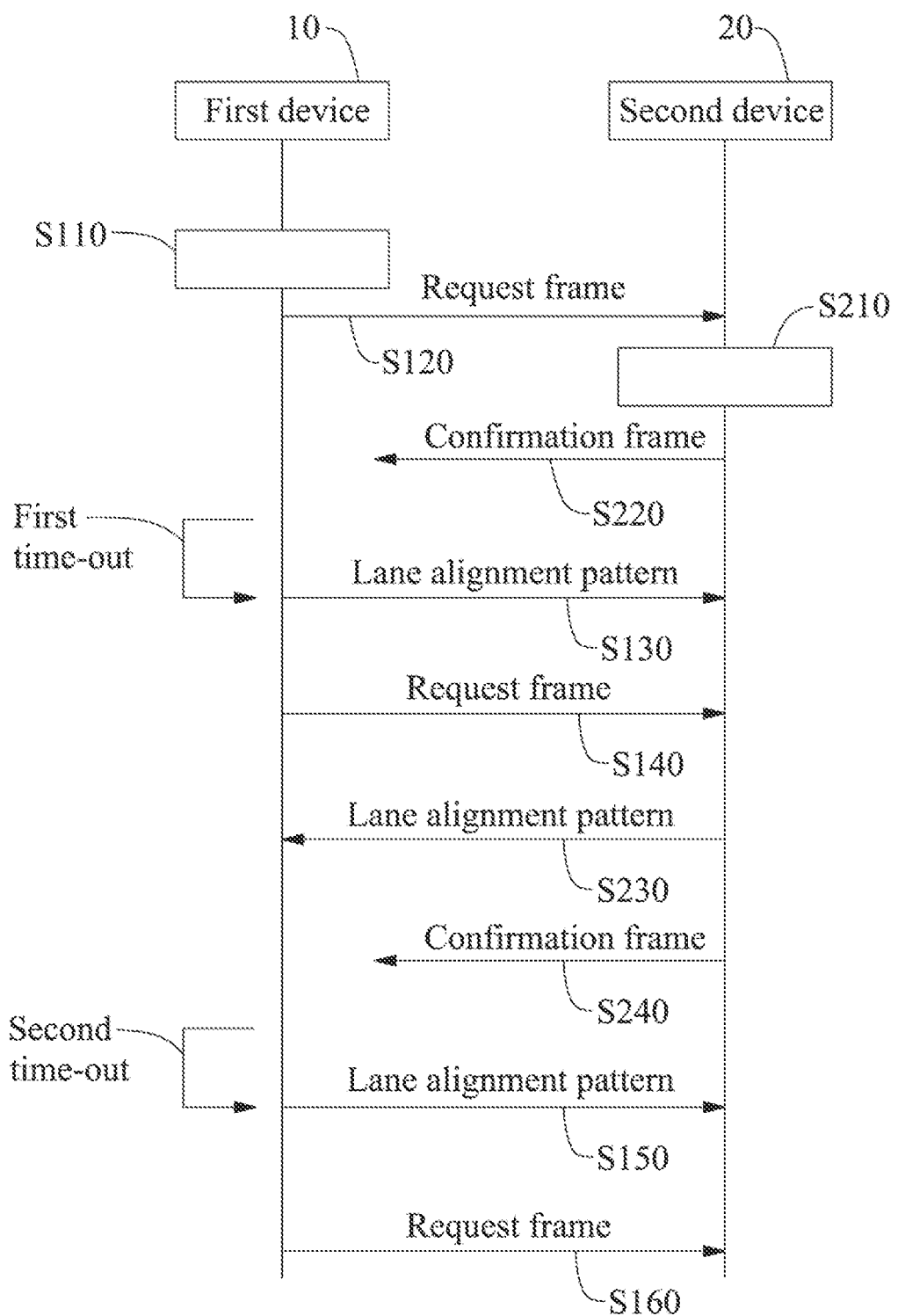
FIG. 4 is a diagram illustrating another embodiment of an operation flow of control protocol frame transmission in an advanced line encoding mode.

FIG. 4 is a diagram illustrating another embodiment of an operation flow of control protocol frame transmission in an advanced line encoding mode. As compared to FIG. 2, the operation flow illustrated in FIG. 4 further comprises operations for frame error recovery when the first device 10 does not receive the confirmation frame of the operation S220.

In operation S130, by the first device 10, in response to not receiving a confirmation frame from the second device 20 within a first time interval after the request frame is transmitted (or called first time-out), a first lane alignment pattern is transmitted in the second burst BA2 to the second device 20. For example, the first lane alignment pattern can be or include at least one an ordered set or data pattern, other than K-code, which both the first device 10 and second device 20 are implemented to use for lane synchronization.

In operation S140, the request frame is re-transmitted in the second burst BA2 to the second device 20 after the first lane alignment pattern is transmitted.

In operation S230, by the second device 20, in response to receiving the request frame from the first device 10 again after the confirmation frame is transmitted, a first lane alignment pattern is transmitted in the second burst BB2 to the first device 10. For example, the first lane alignment pattern in the operation S230 can be implemented as a lane alignment pattern as same as or different from that in the operation S130, provided that the lane alignment pattern can be recognized by both the first device 10 and second device 20 for lane synchronization.

In operation S240, the confirmation frame is re-transmitted in the second burst BB2 to the first device 10 after the first lane alignment pattern is transmitted.

In an embodiment of FIG. 4, the operation flow may further include operations S150 and S160 for re-transmission of the request frame if not receiving the confirmation frame (or called second time-out), similarly to the operations S130 and S140, respectively.

Figure 5A:
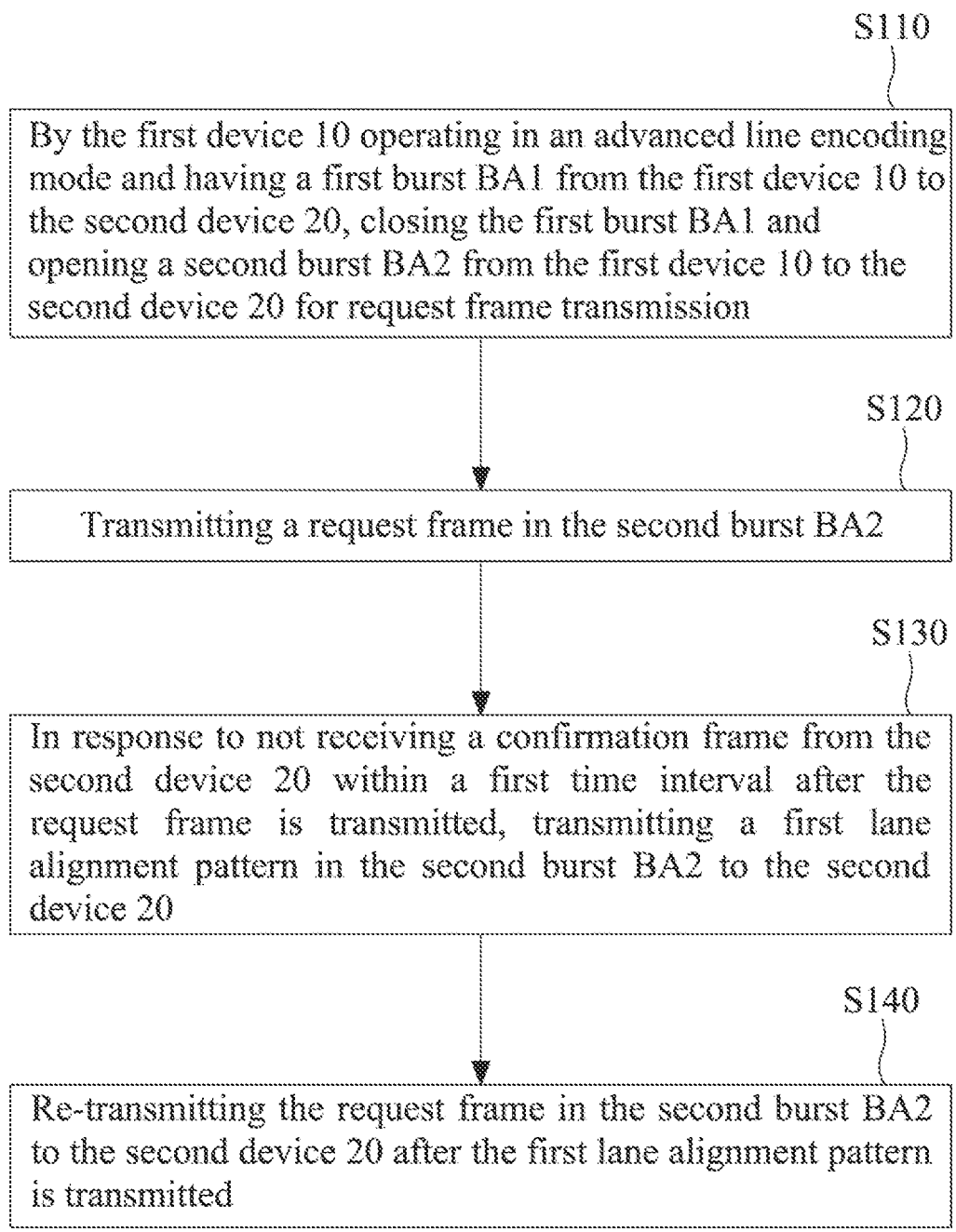
FIG. 5A is a flowchart illustrating another embodiment of a method for control protocol frame transmission with respect to request frames according to FIG. 4.

FIG. 5A is a flowchart illustrating another embodiment of a method for control protocol frame transmission with respect to request frames. The method of FIG. 5A includes the operations S110 to S140 and is provided for the first device 10 to enhance reliability of both control protocol frame transmission with respect to request frames and re-transmission of request frames for error recovery purpose.

Figure 5B:
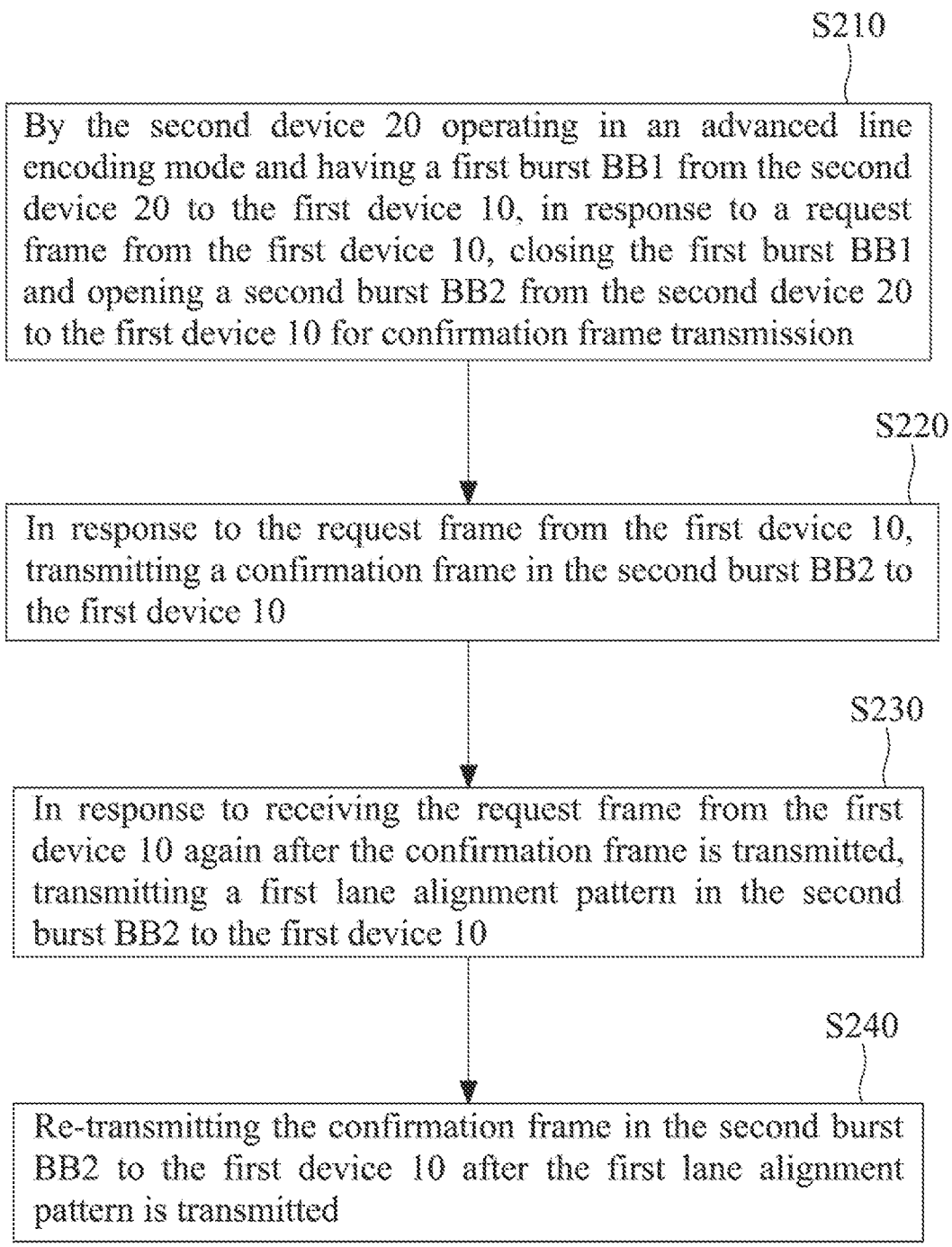
FIG. 5B is a flowchart illustrating another embodiment of a method for control protocol frame transmission with respect to confirmation frames according to FIG. 4.

FIG. 5B is a flowchart illustrating another embodiment of a method for control protocol frame transmission with respect to confirmation frames. The method of FIG. 5B includes the operations S210 to S240 and is provided for the second device 20 to enhance reliability of both control protocol frame transmission with respect to confirmation frames and re-transmission of confirmation frames for error recovery purpose.

The method of FIG. 3A or FIG. 5A is capable of enhancing reliability of both the request frame transmission and re-transmission in the ALE mode where K-Code serving for the receiver side (or called receiving side or peer side) to do symbol alignment and symbol lock operation as described in the conventional UniPro specification is not used. According to the operations S110 and S120 of FIG. 3 or FIG. 5A, the reliability of the request frame transmission can be enhanced by closing an existing burst (e.g., the first burst BA1 for the electronic device such as the first device 10), opening a new burst (e.g., the second burst BA2 for the electronic device such as the first device 10), and then transmitting the request frame in the new burst. In particular, when the ALE mode is implemented in conjunction with a signaling scheme, such as PAM-n (n>2, e.g., PAM-4, PAM-8, or PAM-16) or so on, to enhance overall effective data rates, the request frame transmission according to the operations S110 and S120 becomes more robust.

The method of FIG. 3A or FIG. 5A can be applied to some processes of error recovery for the interconnection protocol for request frame transmission related to the PA layer, for example, transmission of a request frame such as a PA layer related power mode change request frame, a PA layer related peer device attribute getting request frame, or a PA layer related peer device attribute setting request frame.

In some embodiments, when the method of FIG. 3A or FIG. 5A is realized in an electronic device according to the operations S110 and S120, the need for request frame transmission can be indicated by a message or control signal. The message or control signal for request frame transmission, for example, indicates that a request frame is to be transmitted and preparation for transmission of the request frame is needed. The message or control signal can be received from an application layer or from a layer of the interconnection protocol on the local side, or can be an indication signal generated in the controller for preparing a request frame, for example.

Further, according to the operations S130 and S140 of the method of FIG. 5A, transmitting the first lane alignment pattern before re-transmitting the request frame in the second burst can optionally enhance reliability of the request frame re-transmission in the ALE mode where K-Code serving for the receiver side to do symbol alignment and symbol lock operation as described in the conventional UniPro specification is not used.

In addition to the operations S130 and S140, in some embodiments, the method according to FIG. 5A can further include one or more operations of re-transmission of the request frame according to the operations S130 and S140. In an embodiment of the method according to FIG. 5A, when a confirmation frame is not received from the second device 20 within a second time interval after the request frame is re-transmitted, a second lane alignment pattern is transmitted in the second burst (e.g., BA2) to the second device 20 and the request frame is re-transmitted in the second burst to the second device 20 after the second lane alignment pattern is transmitted. The time interval for determining whether to re-transmit the request frame in each round, such as the first, second time interval above or so on, can be configured to be the same or different. The corresponding lane alignment pattern to be transmitted before the request frame transmission in each round, such as the first, second lane alignment pattern above or so on, can also be configured to be the same or different, wherein both the transmitting side and receiving side can be configured or implemented to handle the corresponding lane alignment pattern(s) as configured.

Figure 5C:
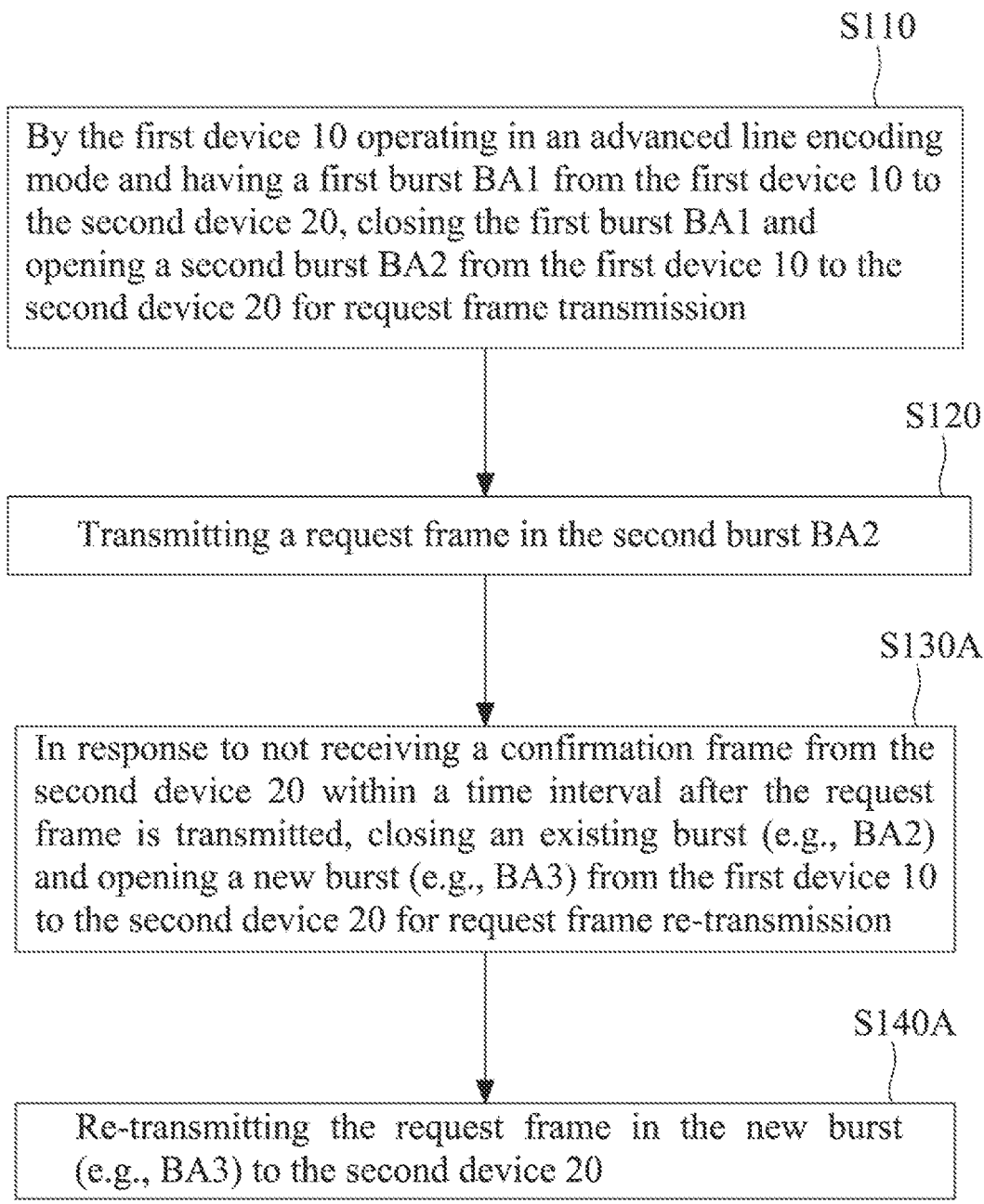
FIG. 5C is a flowchart illustrating an embodiment of a method for control protocol frame transmission with respect to request frames such as peer device attribute getting request frame or setting request frame.

In some embodiments according to FIG. 4, in response to not receiving a confirmation frame from the second device 20 within a time interval after the first device 10 transmits or re-transmits the request frame such as peer device attribute getting request frame or setting request frame, the first device 10 can use alternative operation similar to the operation S110 such as closing the existing burst (e.g., BA2) and opening a new burst optionally to enhance the request frame re-transmission reliability. In this manner, FIG. 5C illustrates an embodiment of a method for control protocol frame transmission with respect to request frames such as peer device attribute getting request frame or setting request frame. The method of FIG. 5C includes the operations S110, S120, S130A, and S140A, for example, performed by the first device 10. In operation S130A, in response to not receiving a confirmation frame from the second device 20 within a time interval (e.g., the first time interval) after the request frame is transmitted (or re-transmitted), an existing burst (e.g., BA2) is closed and a new burst (e.g., BA3, referred as to a third burst for the first device 10) from the first device 10 to the second device 20 is opened for request frame re-transmission. In operation S140A, the request frame is re-transmitted in the new burst (e.g., BA3) to the second device 20. Further, in some embodiments of the method of FIG. 5C, the operations S130A and S140A can be repeated, or the operations S130 and S140 can also be applied.

The methods of FIG. 3B, FIG. 5B, or related embodiments are capable of enhancing reliability of the confirmation frame transmission or re-transmission in the ALE mode where K-Code serving for the receiver side to do symbol alignment and symbol lock operation as described in the conventional UniPro specification is not used. According to the operations S210 and S220 of FIG. 3B or FIG. 5B, the reliability of the confirmation frame transmission can be enhanced by closing an existing burst (e.g., the first burst BB1 for the second device 20), opening a new burst (e.g., the second burst BB2 for the second device 20), and then transmitting the confirmation frame in the new burst. In particular, when the ALE mode is implemented in conjunction with a signaling scheme, such as PAM-n (n>2, e.g., PAM-4, PAM-8, or PAM-16) or so on, to enhance overall effective data rates, the confirmation frame transmission according to the operations S210 and S220 becomes more robust.

The method of FIG. 3B or FIG. 5B can be applied to some processes of error recovery for the interconnection protocol for confirmation frame transmission related to the PA layer, for example, transmission of a confirmation frame, such as a PA layer related power mode change confirmation frame, a PA layer related peer device attribute getting confirmation frame, or a PA layer related peer device attribute setting confirmation frame. In addition, at the operations S210 and S220, the request frame from the other electronic device (e.g., the first device 10), for example, can be a PA layer related power mode change request frame, a PA layer related attribute getting request frame, or a PA layer related attribute setting request frame. The request frame can be received from a controller of the other electronic device (e.g., the first device 10), for example.

Further, according to the operations S230 and S240 of the method of FIG. 5B, transmitting a lane alignment pattern before re-transmitting the confirmation frame in a burst can optionally enhance reliability of the confirmation frame re-transmission in the ALE mode where K-Code serving for the receiver side to do symbol alignment and symbol lock operation as described in the conventional UniPro specification is not used.

In addition to the operations S230 and S240, in some embodiments, the method according to FIG. 5B can further include one or more operations of re-transmission of the confirmation frame according to the operations S230 and S240. In an embodiment of the method according to FIG. 5B, in response to receiving the request frame from the other electronic device again after the confirmation frame is re-transmitted, a second lane alignment pattern is transmitted in the second burst (e.g., BB2) to the other electronic device (e.g., the first device 10) and the confirmation frame is re-transmitted in the second burst to the other electronic device after the second lane alignment pattern is transmitted. The corresponding lane alignment pattern to be transmitted before the confirmation frame transmission in each round, such as the first, second lane alignment pattern above or so on, can be configured to be the same or different, wherein both the transmitting side and receiving side can be configured or implemented to handle the corresponding lane alignment pattern(s) as configured.

Figure 5D:
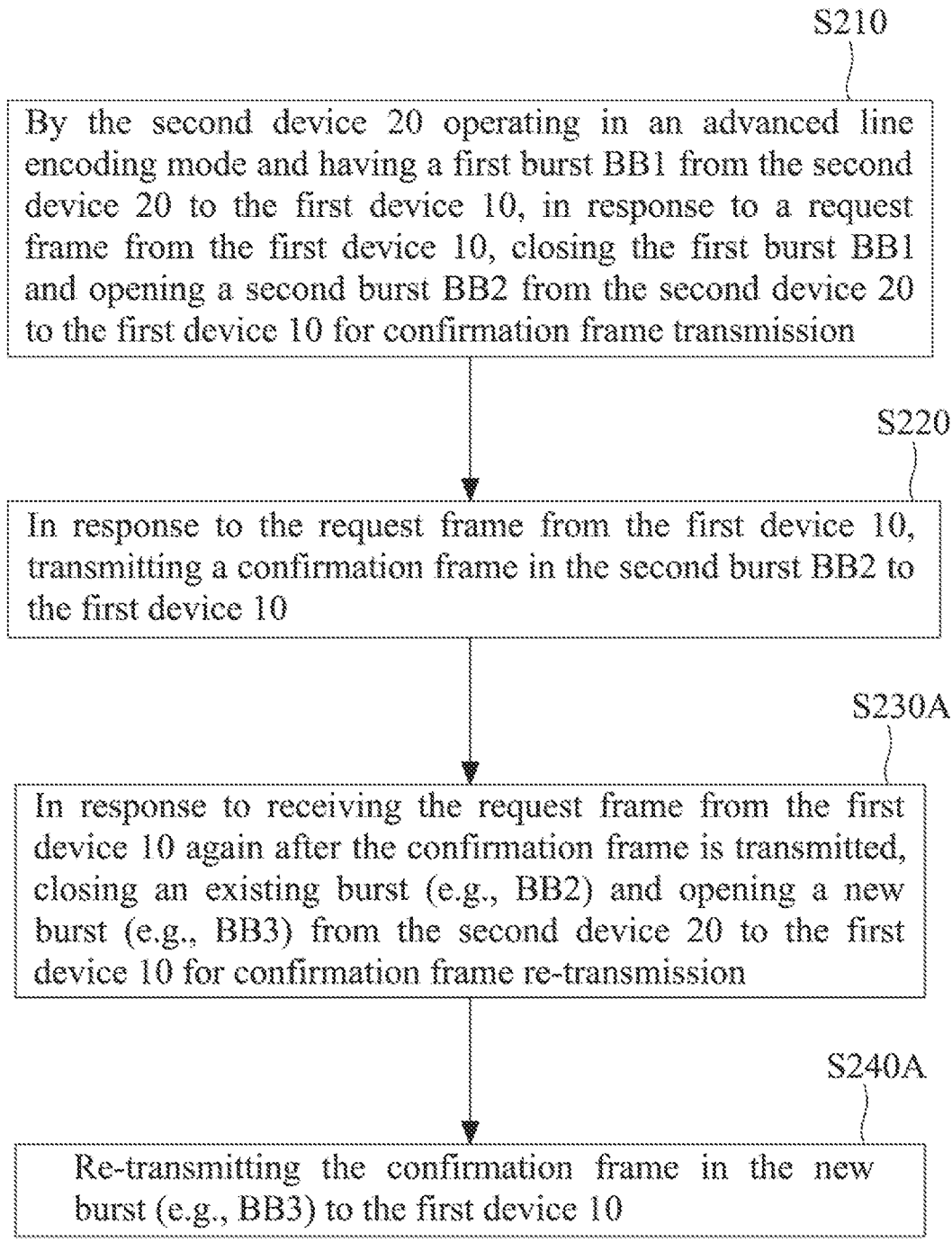
FIG. 5D is a flowchart illustrating another embodiment of a method for control protocol frame transmission with respect to confirmation frames in response to request frames such as peer device attribute getting request frame or setting request frame.

Furthermore, in some embodiments according to FIG. 4, in response to receiving the request frame such as peer device attribute getting request frame or setting request frame again after the confirmation frame is transmitted or re-transmitted by the first device 10, the second device 20 can use an alternative operation similar to the operation S210 such as closing the existing burst and opening a new burst optionally to enhance the confirmation frame re-transmission reliability. In this manner, FIG. 5D illustrates an embodiment of a method for control protocol frame transmission with respect to confirmation frames in response to request frames such as peer device attribute getting request frame or setting request frame. The method of FIG. 5D includes the operations S210, S220, S230A, and S240A, for example, performed by the second device 20. In operation S230A, in response to receiving the request frame from the first device 10 again after the confirmation frame is transmitted (or re-transmitted), an existing burst (e.g., BB2) is closed and a new burst (e.g., BB3, referred to as a third burst for the second device 20) from the second device 20 to the first device 10 is opened for confirmation frame re-transmission. In operation S240A, the confirmation frame is re-transmitted in the new burst (e.g., BB3) to the second device 20. Further, in some embodiments of the method of FIG. 5D, the operations S230A and S240A can be repeated, or the operations S230 and S240 can also be applied.

The method in any one of FIGS. 3A-3B and FIGS. 5A-5D or related embodiments can be regarded as an operation method of a local host or remote device in a variety of operation flows for error recovery that may be encountered in practical scenarios. Regarding this, scenarios involving error recovery of PACP frames are illustrated in the examples below.

Figure 6:
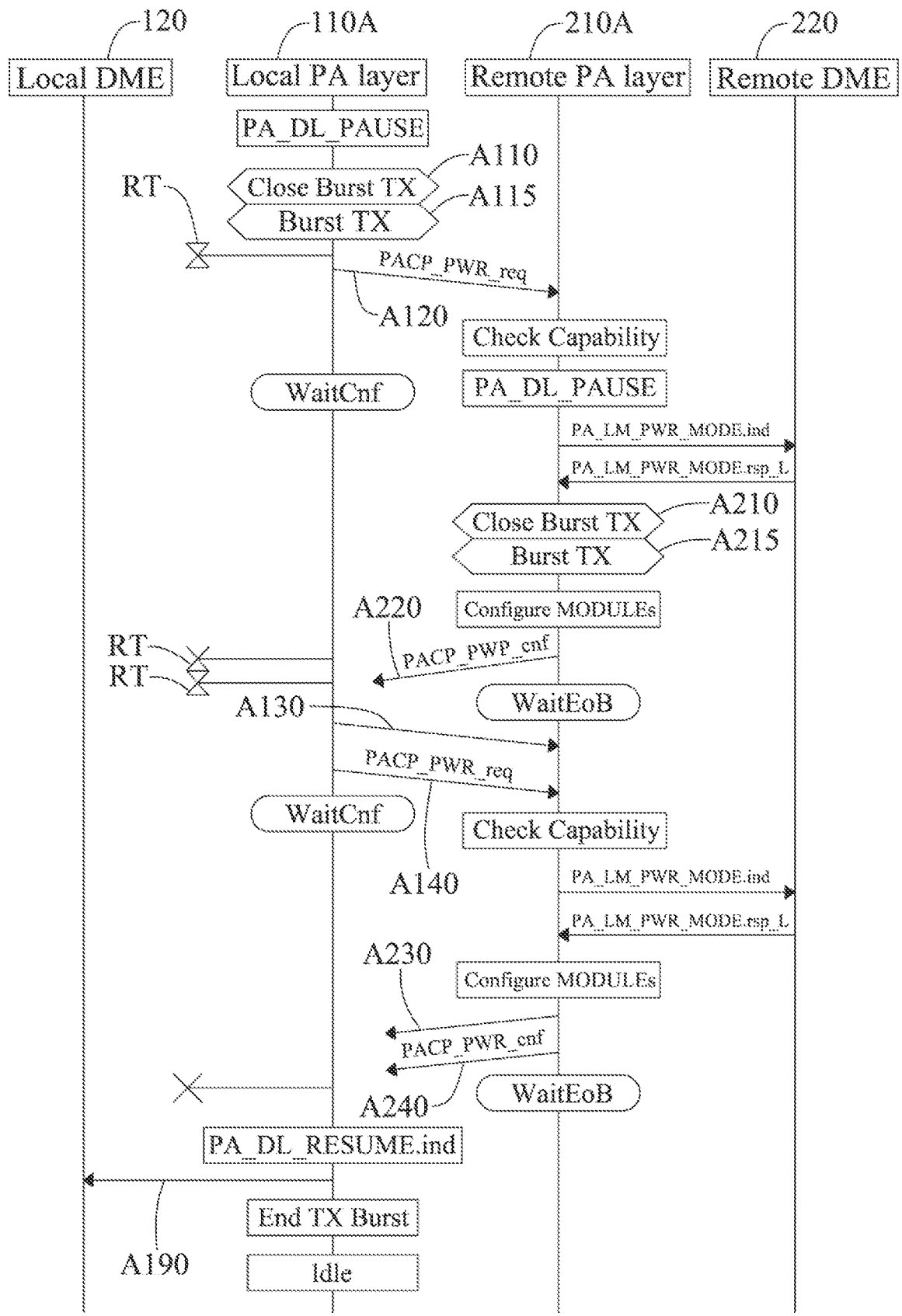
FIG. 6 is a diagram illustrating an embodiment of an operation flow of error recovery for power mode change in an advanced line encoding mode.

FIG. 6 illustrates an embodiment of an operation flow of error recovery for power mode change in an advanced line encoding mode. In FIG. 6, the error recovery is performed with respect to a request frame or a confirmation frame for power mode change, which are denoted by PACP_PWR_req and PACP_PWR_cnf, respectively, for example.

Before discussion of FIG. 6, some assumptions are mentioned as follows. In FIG. 6 or similar Figures such as FIG. 7, a local host, such as the first device 10, can be represented by a local PA layer 110A and a local DME 120, which can be implemented as modules in the first device 10; and a remote device, such as the second device 20, can be represented by a remote PA layer 210A and a remote DME 220, which can be implemented as modules in the second device 20.

In FIG. 6, at a local side, the local PA layer 110A is instructed to send a PACP_PWR_req frame to a peer side. A PACP_PWR_req frame is used when changing a Link's power configuration or entering hibernation. Regarding transmission of the corresponding PACP_PWR_req frame, there are two scenarios for the local PA layer 110A. In a scenario (a) where a burst from the local host to the remote device does not exist, the local PA layer 110A needs to open a new burst for the local host to transmit the required PACP_PWR_req frame. In another scenario (b) where a burst for the local host exists, the local PA layer 110A can take advantage of the existing burst to transmit PACP frames in an example. For the scenario (b), in another example, the local PA layer 110A can close the existing burst and opens a new burst, as indicated by operation A110 and A115, to transmit the required PACP request frame, e.g., PACP_PWR_req frame, as indicated by operation A120.

The operations A110, A115, and A120 can be regarded as examples of the operations S110 and S120 of the method in FIG. 3A or FIG. 5A. When a PACP_PWR_req frame is transmitted, a request timer RT (e.g., PACP_REQUEST_TIMER), indicated by an hourglass symbol in FIG. 6, is set. After that, the local PA layer 110A waits for confirmation (e.g., indicated by "WaitCnf" in the Figures).

As illustrated in FIG. 6, after receiving the PACP_PWR_req frame, the remote PA layer 210A prepares to respond with a corresponding PACP_PWR_cnf frame. Regarding transmission of the corresponding PACP frame, there are two scenarios for the remote PA layer 210A. In a scenario (a) where a burst from the remote device to the local host does not exist, the remote PA layer 210A needs to open a new burst for the remote device to transmit the required PACP_PWR_cnf frame. In another scenario (b) where a burst for the remote device exists, the remote PA layer 210A can take advantage of the existing burst to transmit PACP frames in an example. For the scenario (b), in another example, the remote PA layer 210A can close the existing burst and opens a new burst, as indicated by operation A210 and A215, to transmit the required PACP confirmation frame, e.g., PACP_PWR_cnf frame, as indicated by operation A220. The operations A210, A215, and A220 can be regarded as examples of the operations S210 and S220 of the method in FIG. 3B or FIG. 5B.

It is assumed that the PACP_PWR_cnf frame from the remote PA layer 210A is lost. On the local PA layer 110A, no corresponding PACP_PWR_cnf frame is received and the request timer RT (e.g., PA_REQUEST_TIMER) expires, as indicated by a cross symbol. At this time point, the burst for the local host is still opened. The local PA layer 110A sends a lane alignment pattern (e.g., asserting an ordered set pattern such as SKP_OS+SDS_OS as will be exemplified below), as indicated by operation A130, to synchronize the transmission path and remote PA receiving path. The local PA layer 110A sends the PACP_PWR_req frame again for retry, as indicated by operation A140. The operations A130 and A140 can be regarded as examples of the operations S130 and S140 of the method in FIG. 5A. When the PACP_PWR_req frame is sent again or re-transmitted, a request timer RT (e.g., PACP_REQUEST_TIMER), indicated by an hourglass symbol, is set. After that, the local PA layer 110A waits for confirmation again.

As illustrated in FIG. 6, the remote PA layer 210A receives the retried PACP_PWR_req frame. At this time point, the burst for the remote device is still opened. The remote PA layer 210A sends a lane alignment pattern (e.g., asserting an ordered set pattern such as SKP_OS+SDS_OS), as indicated by operation A230, to synchronize the transmission path and remote PA receiving path. The remote PA layer 210A sends the corresponding PACP_PWR_cnf frame again, as indicated by operation A240, to respond to the re-transmitted PACP_PWR_req frame. The operations A230 and A240 can be regarded as examples of the operations S230 and S240 of the method in FIG. 5B.

It is assumed that the PACP_PWR_cnf frame from the remote PA layer 210A is lost again. On the local PA layer 110A, no corresponding PACP_PWR_cnf frame is received and the request timer RT (e.g., PA_REQUEST_TIMER) expires. The local PA layer 110A then reports an error event to the local DME layer 120, as indicated by operation A190. For example, according to the UniPro specification, a primitive, such as PA_LM_PWR_MODE_CHANGED.ind, can be used to report error results of the request with a parameter 'PowerChangeResultCode' set to 'PWR_FATAL_ERROR'. The local PA layer 110A aborts the Power Mode request (e.g., PACP_PWR_req) due to a communication problem. In this manner, the embodiment of the error recovery mechanism is finished. In addition, some embodiments based on FIG. 6 can be obtained where the retry can be performed once or more times until a specific number of retry limit is arrived.

In addition, during the above operations, the operation flow shown in FIG. 6 can be derived from and performed according to the UniPro specification (such as UniPro version 2.0 or so on). For example, before sending any PACP frame, the local PA layer 110A performs the related processing of PA_DL_PAUSE.ind primitives to pause the data link layer transmission. For example, when a PACP_PWR_req frame is transmitted, a PACP request timer, denoted by PACP_REQUEST_TIMER, is set to a specific value. In addition, for example, the remote PA layer 210A responds to the PACP_PWR_req frame and performs a capability checking according to the UniPro specification. The remote PA layer 210A performs the related processing of PA_DL_PAUSE.ind primitives to pause the data link layer transmission on the remote device and transmits a PA_LM_PWR_MODE.ind primitive to the remote DME 220. The remote DME 220 responds with a PA_LM_PWR_MODE.rsp_L primitive. In response to the PA_LM_PWR_MODE.rsp_L primitive, the remote PA layer 210A sets the configuration of the modules and sets the configuration of the relevant parameters or state to the modules in the M-PHY layer. The remote PA layer 210A then waits for the end of the remote burst (e.g., denoted by "WaitEoB"). After the error recovery operations, the local PA layer 110A performs the related processing of PA_DL_RESUME.ind primitives to resume the data link layer transmission.

Figure 7:
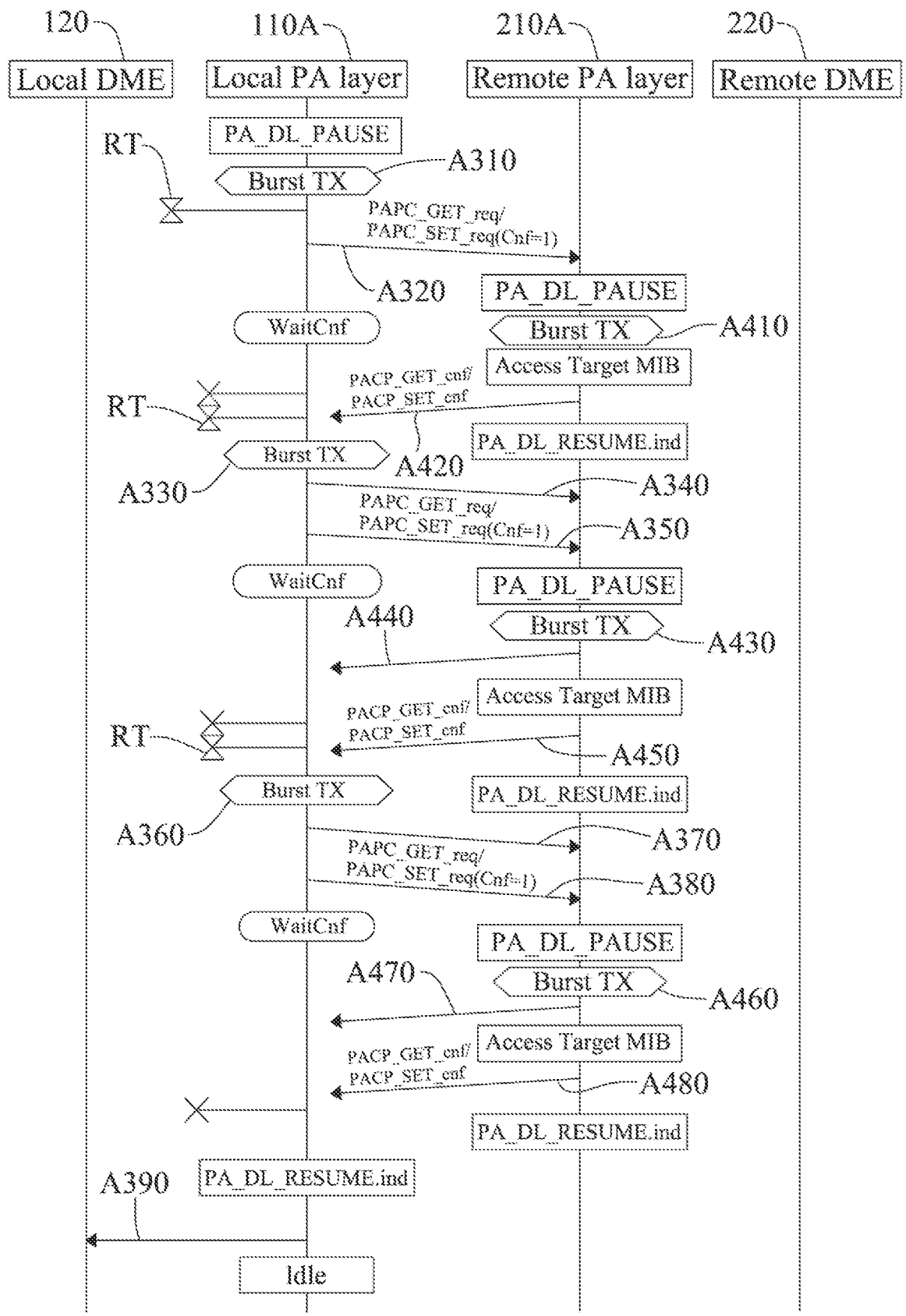
FIG. 7 is a diagram illustrating another embodiment of an operation flow of error recovery for peer device attribute getting or setting in an advanced line encoding mode.

FIG. 7 illustrates another embodiment of an operation flow of error recovery for peer device attribute getting or setting in an advanced line encoding mode. In FIG. 7, the error recovery is performed with respect to a request frame and a confirmation frame for peer device attribute getting or setting, which are represented by PACP_GET_req (or PACP_SET_req) and PACP_GET_cnf (or PACP_SET_cnf) in the UniPro specification, for example.

In FIG. 7, at a local side, the local PA layer 110A is instructed to send a PACP_SET_req or PACP_GET_req frame to a peer side. A PACP_SET_req frame is used to set the value of an Attribute. A PACP_GET_req frame is used to request the value of an Attribute. Regarding transmission of the corresponding PACP_SET_req or PACP_GET_req frame, there are two scenarios for the local PA layer 110A. In a scenario (a) where a burst from the local host to the remote device does not exist, the local PA layer 110A needs to open a new burst for the local host to transmit the required PACP_SET_req or PACP_GET_req frame. In another scenario (b) where a burst for the local host exists, the local PA layer 110A can take advantage of the existing burst to transmit PACP frames in an example. For the scenario (b), in another example, the local PA layer 110A can close the existing burst and opens a new burst, as indicated by operation A310, to transmit the required PACP request frame, such as PACP_SET_req or PACP_GET_req frame, as indicated by operation A320. The operations A310 and A320 can be regarded as examples of the operations S110 and S120 of the method in FIG. 3A or FIG. 5A. When a PACP_SET_req or PACP_GET_req is transmitted, a request timer RT (e.g., PACP_REQUEST_TIMER), indicated by an hourglass symbol in FIG. 7, is set. After that, the local PA layer 110A waits for confirmation.

As illustrated in FIG. 7, after receiving the PACP_SET_req or PACP_GET_req frame, the remote PA layer 210A prepares to respond with a corresponding PACP_SET_cnf or PACP_GET_cnf frame. Regarding transmission of the corresponding PACP frame, there are two scenarios for the remote PA layer 210A. In a scenario (a) where a burst from the remote device to the local host does not exist, the remote PA layer 210A needs to open a new burst for the remote device to transmit the required PACP_SET_cnf or PACP_GET_cnf frame. In another scenario (b) where a burst for the remote device exists, the remote PA layer 210A can take advantage of the existing burst to transmit PACP frames in an example. For the scenario (b), in another example, the remote PA layer 210A can close the existing burst and opens a new burst, as indicated by operation A410, to transmit the required PACP confirmation frame, e.g., PACP_SET_cnf or PACP_GET_cnf frame, as indicated by operation A420. The operations A410 and A420 can be regarded as examples of the operations S210 and S220 of the method in FIG. 3B or FIG. 5B.

It is assumed that the PACP_SET_cnf or PACP_GET_cnf frame from the remote PA layer 210A is lost. On the local PA layer 110A, no corresponding PACP_PWR_cnf frame is received and the request timer RT (e.g., PA_REQUEST_TIMER) expires, as indicated by a cross symbol. At this time point, the burst for the local host is still opened. The local PA layer 110A starts the error recovery mechanism for the first retry sequence. The local PA layer 110A can perform the first retry in different approaches.

In an example, the local PA layer 110A can optionally close the existing burst and opens a new burst, as indicated by operation A330, to transmit the required PACP request frame (PACP_SET_req or PACP_GET_req frame), as indicated by operation A350. The operations A330 and A350 can be regarded as examples of the operations S110 and S120 of the method in FIG. 3A or FIG. 5A, or as examples of the operations S130A and S140A of the method in FIG. 5C.

In another example, the local PA layer 110A can optionally take advantage of the existing burst to transmit the required PACP frame. Before transmitting the required PACP frame, the local PA layer 110A sends a lane alignment pattern (e.g., asserting an ordered set pattern such as SKP_OS+SDS_OS), as indicated by operation A340, to synchronize the transmission path and remote PA receiving path. The local PA layer 110A then sends the required PACP frame again for the first retry, as indicated by operation A350. The operations A340 and A350 can be regarded as examples of the operations S130 and S140 of the method in FIG. 5A.

After a PACP_SET_req or PACP_GET_req frame is re-transmitted, a request timer RT (e.g., PACP_REQUEST_TIMER), indicated by an hourglass symbol in FIG. 7, is set. After that, the local PA layer 110A waits for confirmation.

As illustrated in FIG. 7, after receiving the PACP_SET_req or PACP_GET_req frame, the remote PA layer 210A prepares to respond with a corresponding PACP_SET_cnf or PACP_GET_cnf frame. At this time point, the burst for the remote device is still opened. The remote PA layer 210A can perform the transmission in different approaches.

In an example, the remote PA layer 210A can optionally close the existing burst and opens a new burst, as indicated by operation A430, to transmit the required PACP confirmation frame (PACP_SET_cnf or PACP_GET_cnf frame), as indicated by operation A450. The operations A430 and A450 can be regarded as examples of the operations S210 and S220 of the method in FIG. 3B or FIG. 5B, or as examples of the operations S230A and S240A of the method in FIG. 5D.

In another example, the remote PA layer 210A can optionally take advantage of the existing burst to transmit the required PACP frame. Before transmitting the required PACP frame, the remote PA layer 210A sends a lane alignment pattern (e.g., asserting an ordered set pattern such as SKP_OS+SDS_OS), as indicated by operation A440, to synchronize the transmission path and remote PA receiving path. The remote PA layer 210A then sends the required PACP confirmation frame, as indicated by operation A450. The operations A440 and A450 can be regarded as examples of the operations S230 and S240 of the method in FIG. 5B.

It is assumed that the PACP_SET_cnf or PACP_GET_cnf frame from the remote PA layer 210A is lost again. On the local PA layer 110A, no corresponding PACP_SET_cnf or PACP_GET_cnf frame is received and the request timer RT (e.g., PA_REQUEST_TIMER) expires, as indicated by a cross symbol. At this time point, the burst for the local host is still opened. The local PA layer 110A starts the error recovery mechanism for the second retry sequence. The local PA layer 110A can perform the second retry in different approaches.

In an example, the local PA layer 110A can optionally close the existing burst and opens a new burst, as indicated by operation A360, to transmit the required PACP request frame (PACP_SET_req or PACP_GET_req frame), as indicated by operation A380, for the second retry. The operations A360 and A380 can be regarded as examples of the operations S110 and S120 of the method in FIG. 3A or FIG. 5A, or as examples of the operations S130A and S140A of the method in FIG. 5C.

In another example, the local PA layer 110A can optionally take advantage of the existing burst to transmit the required PACP frame. Before transmitting the required PACP frame, the local PA layer 110A sends a lane alignment pattern (e.g., asserting an ordered set pattern such as SKP_OS+SDS_OS), as indicated by operation A370, to synchronize the transmission path and remote PA receiving path. The local PA layer 110A then sends the required PACP frame again for the second retry, as indicated by operation A380. The operations A370 and A380 can be regarded as examples of the operations S130 and S140 of the method in FIG. 5A.

After a PACP_SET_req or PACP_GET_req frame is re-transmitted, a request timer RT (e.g., PACP_REQUEST_TIMER), indicated by an hourglass symbol in FIG. 7, is set. After that, the local PA layer 110A waits for confirmation.

As illustrated in FIG. 7, after receiving the PACP_SET_req or PACP_GET_req frame for the second retry, the remote PA layer 210A prepares to respond with a corresponding PACP_SET_cnf or PACP_GET_cnf frame. At this time point, the burst for the remote device is still opened. The remote PA layer 210A can perform the transmission in different approaches.

In an example, the remote PA layer 210A can optionally close the existing burst and opens a new burst, as indicated by operation A460, to transmit the required PACP confirmation frame (PACP_SET_cnf or PACP_GET_cnf frame), as indicated by operation A480. The operations A460 and A480 can be regarded as examples of the operations S210 and S220 of the method in FIG. 3B or FIG. 5B, or as examples of the operations S230A and S240A of the method in FIG. 5D.

In another example, the remote PA layer 210A can optionally take advantage of the existing burst to transmit the required PACP confirmation frame. Before transmitting the required PACP confirmation frame, the remote PA layer 210A sends a lane alignment pattern (e.g., asserting an ordered set pattern such as SKP_OS+SDS_OS), as indicated by operation A470, to synchronize the transmission path and remote PA receiving path and then sends the required PACP confirmation frame, as indicated by operation A480. The operations A470 and A480 can be regarded as examples of the operations S230 and S240 of the method in FIG. 5B.

It is assumed that the PACP_SET_cnf or PACP_GET_cnf frame from the remote PA layer 210A is still lost. After the PACP_REQUEST_TIMER expires, the local PA layer 110A reports an error event to the local DME layer 120, as indicated by operation A390. For example, according to the UniPro specification (e.g., UniPro version 2.0), a primitive, such as PA_LM_PEER_SET.cnf or PA_LM_PEER_GET.cnf, can be used to report error results of the request with a parameter 'ConfigResultCode' set to 'PEER_COMMUNICATION_FAILURE'. The local PA layer 110A aborts the request (e.g., PACP_SET_req or PACP_GET_req) due to a peer side communication problem. In this manner, the embodiment of the error recovery mechanism is finished. In addition, some embodiments based on FIG. 7 can be obtained where the retry can be performed once or more times until a specific number of retry limit is arrived.

In addition, during the above operations, the operation flow shown in FIG. 7 can be derived from and performed according to the UniPro specification (such as UniPro version 2.0 or so on). For example, before sending any PACP frame, the local PA layer 110A performs the related processing of PA_DL_PAUSE.ind primitives to pause the data link layer transmission. In addition, for example, the remote PA layer 210A responds to the PACP_SET_req or PACP_GET_req frame and performs access to target management information base (MIB) for setting or getting Attributes according to the UniPro specification. The remote PA layer 210A performs the related processing of PA_DL_PAUSE.ind primitives to pause the data link layer transmission on the remote device. After the error recovery operations, the local PA layer 110A or remote PA layer 210A performs the related processing of PA_DL_RESUME.ind primitives to resume the data link layer transmission.

In the embodiments of FIG. 2 to FIG. 7, closing a burst and opening a new burst can be performed for transmission of specific PACP frames or asserting of a lane alignment pattern (e.g., an ordered set pattern such as SKP_OS+SDS_OS) can be performed before the transmission of replayed PACP frame. The above operations are helpful for block realignment under the ALE encoding scheme. By this way, the PACP frame transmitting side and receiving side have the second chance to achieve the synchronization. Then, the possibility for success PACP frame transmission can be enhanced.

Moreover, in the advanced line encoding mode, 8b/10b coding in M-PHY is not used and the physical layer of the interconnection protocol with ALE may be implemented to perform bits transmission using a specific signaling scheme. In some embodiment, an electronic device may be implemented according to the interconnection protocol with an advanced line encoding scheme, such as 128b/129b, 128b/130b, or 128b/132b, or so on, in conjunction with a signaling scheme, such as PAM-n (e.g., n>2; e.g., PAM-4, PAM-8, or PAM-16) or so on, to enhance overall effective data rates. In these embodiments, the link of the electronic device in the advanced line encoding mode may have a bit error rate higher than that of the 8b/10b coding scheme in conjunction with a NRZ signaling. In this case, the possibility for success PACP control or confirmation frame transmission in the embodiments of the advanced line encoding can be enhanced more effectively and efficiently by implementation of a method based on one or more embodiments or examples of FIG. 2 to FIG. 7. In other words, a method based on one or more embodiments or examples of FIG. 2 to FIG. 7 can facilitate the implementation of the interconnection protocol with ALE in conjunction with an enhanced signaling scheme instead of the NRZ signaling. Certainly, the implementation of the present disclosure is not limited to the embodiments or examples. For example, a method based on one or more embodiments or examples of FIG. 2 to FIG. 7 can also be applied to an interconnection protocol based on a modified version of UniPro, a modified version of UFS, or other communication protocol, whenever appropriate.

The following provides various embodiments for implementation of the interconnection protocol with the ALE according to FIG. 1.

Figure 8A:
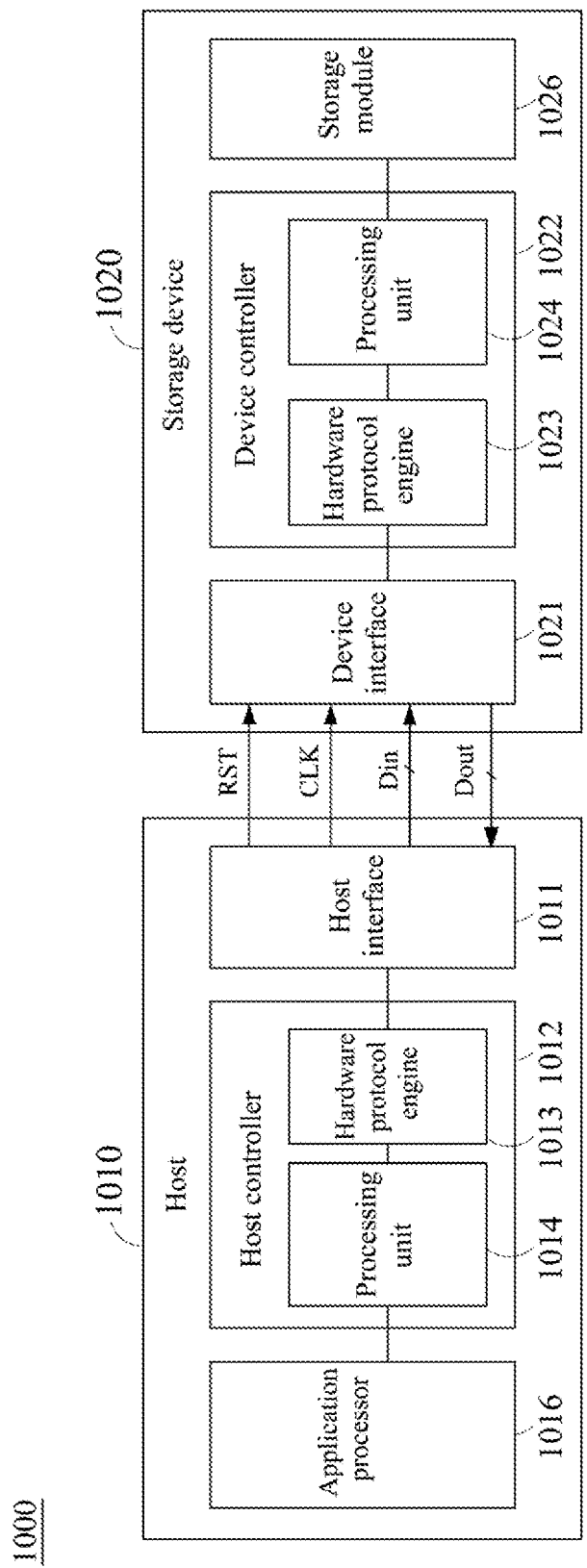
FIG. 8A is a diagram illustrating circuit architecture of a storage system for an interconnection protocol capable of performing ALE according to an embodiment of the present disclosure.
Figure 8B:
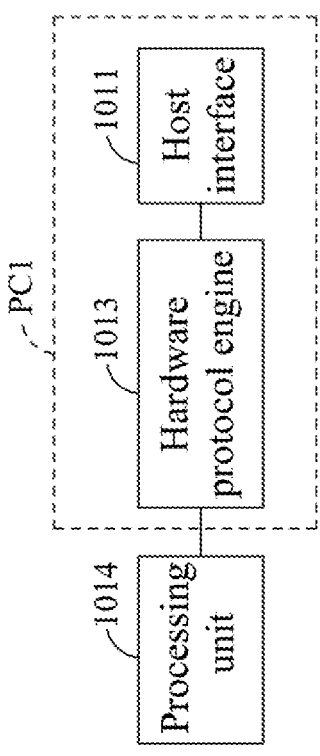
FIG. 8B is a block diagram illustrating circuit architecture applicable to the controller in FIG. 8A for the interconnection protocol according to an embodiment of the present disclosure.
Figure 8C:
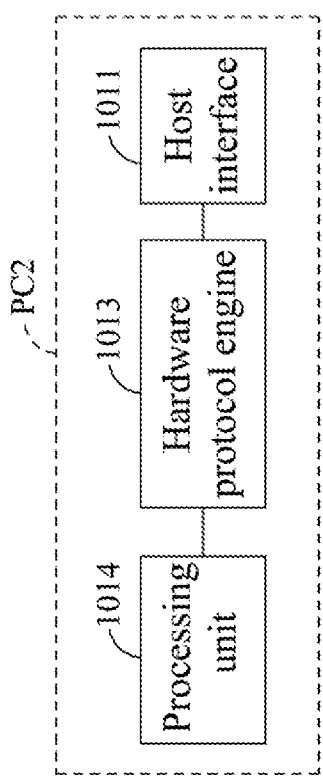
FIG. 8C is a block diagram illustrating circuit architecture applicable to the controller in FIG. 8A for the interconnection protocol according to an embodiment of the present disclosure.

Referring to FIG. 8A, a diagram of circuit architecture is shown according to an embodiment of the present disclosure. As shown in FIG. 8A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of performing an ALE as mentioned above based on FIG. 1 or any one or more of the embodiments above. According to the circuit architecture in FIG. 8A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 8A, a controller in the host 1010 or the storage device 1020 used to implement the interconnection protocol may be implemented by various configurations. As shown in FIG. 8A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 8B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 8C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 8A, the controller used to implement the interconnection protocol in the host 1010 or the storage device 1020 can be regarded to cover or represent the embodiment based on FIG. 8A, FIG. 8B, or FIG. 8C. The description of other examples related to FIG. 8A is also suitable for the embodiments based on FIG. 8A, FIG. 8B, or FIG. 8C.

The circuit architecture shown in FIG. 8A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it sends a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer. In addition, the hardware protocol engine 1013 (or the host controller 1012) can be regarded as an embodiment of the link controller 100 of the first device 10 shown in FIG. 1.

The processing unit 1014 is coupled to the hardware protocol engine 1013, and communicates with the application processor 1016. The processing unit 1014 can execute one or more pieces of firmware. For example, an access operation command or write data sent by an operating system, a driver, or an application executed by the application processor 1016 is converted into a command or data in a format compliant with the link layer of the interconnection protocol by the firmware executed by the processing unit 1014, and is then sent to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional, that is, the task of the firmware above may be implemented at the hardware protocol engine 1013 in hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and sends an access operation command or write data to the storage device 1020 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer. In addition, the hardware protocol engine 1023 (or the device controller 1022) can be regarded as an embodiment of the link controller 200 of the second device 20 shown in FIG. 1.

The processing unit 1024 is coupled to the hardware protocol engine 1023, and communicates with the host 1010 through the device interface 1021. The processing unit 1024 can execute one or more pieces of firmware. For example, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 8A, the host interface 1011 can be coupled to the device interface 1021, for example, through data lines Din and Dout for transmitting/receiving data, a reset line RST for transmitting a hardware reset signal, and a clock line CLK for transmitting data. The data lines Din and Dout can be implemented in multiple pairs, wherein one pair of data lines Din or one pair of data lines Dout can be referred to as a lane for transmitting differential signals, for example. The host interface 1011 can communicate with the device interface 1021 by using at least one interface protocol based on an advanced line encoding scheme, such as 128b/130b or 128b/132b coding scheme or so on; however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol with the ALE for illustration. The UFS standard includes a UFS command set (UCS) layer, a UFS transport (UTP) layer, and a UFS interconnect (UIC) layer. The UIC layer includes a link layer and a physical layer. In the interconnection protocol with the ALE, the link layer of the UIC layer can be implemented according to a modified version of the UniPro specification, and the physical layer of the UIC layer can be implemented according to a modified version of the M-PHY specification. Under the interconnection protocol, since the implementations of the modified UniPro and modified M-PHY with respect to the ALE are hidden from the other layers (such as UCS, UTP layers) of the UFS standard, the implementation complexity of the interconnection protocol with the ALE can be reduced.

Figure 9:
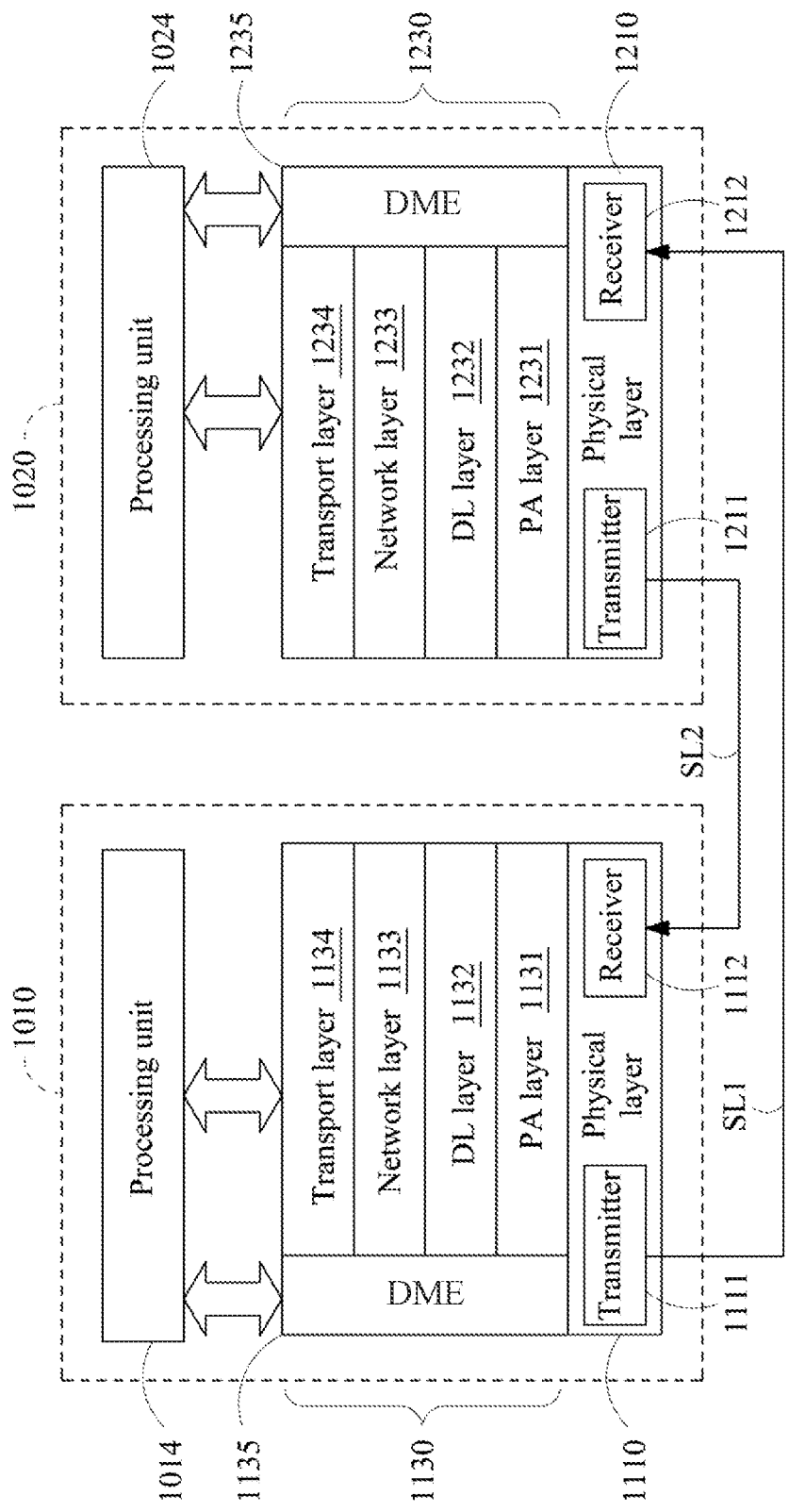
FIG. 9 is a schematic diagram of an embodiment of a layered structure of the storage system in FIG. 8A with respect to the interconnection protocol capable of performing an ALE.

Referring to FIG. 9, a schematic diagram of an embodiment of layered architecture of the storage system in FIG. 8A is shown according to the UFS standard and FIG. 1. Because the UFS standard is based on the MIPI UniPro layer and the MIPI M-PHY layer, the host interface 1011 and the hardware protocol engine 1013 of the host 1010 shown in FIG. 8A are respectively used to implement a modified physical layer 1110 and a modified UniPro layer 1130 in FIG. 9. Also, the device interface 1021 and the hardware protocol engine 1023 of the storage device 1020 in FIG. 8A are respectively used to implement a modified physical layer 1210 and a modified UniPro layer 1230 in FIG. 9.

As shown in FIG. 9, the modified UniPro layer 1130 (or 1230) can include a modified PHY adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified PHY adapter layer (1131 or 1231) couples the modified physical layer (1110 or 1210) to the data link layer (1132 or 1232). The modified PHY adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified PHY adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power consumption mode change.

Figure 10A:
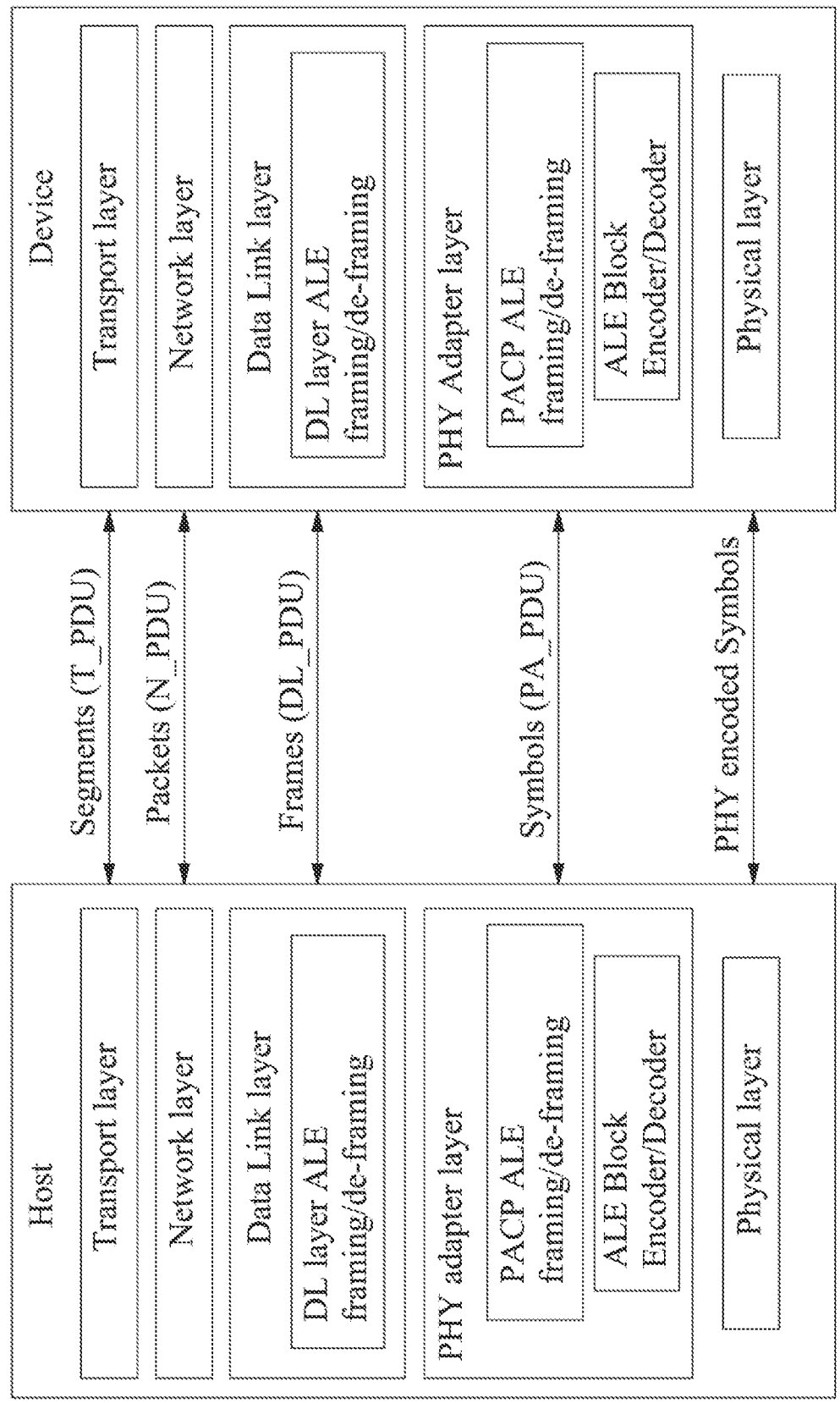
FIG. 10A is a schematic diagram illustrating an embodiment of a system capable of performing an ALE.

FIG. 10A is a schematic diagram illustrating an embodiment of a system capable of performing an advanced line encoding (ALE). In this embodiment as shown in FIG. 10A, either the host or device of a modified UFS system has new functionality for the ALE. The layers as shown in FIG. 10A, such as data link layer and PA layer, can be regarded as an embodiment of the corresponding layers as shown in FIG. 9. In FIG. 10A, the data link layer includes functionality for DL layer ALE framing/de-framing and thus a data link layer frame can be generated for the transmitting side in a new data format, which can be derived from the data format used in a UniPro specification. The PA layer includes functionality for PACP ALE framing/de-framing and thus a PACP frame can be generated for the transmitting side in a new data format, which can be derived from the data format used in a UniPro specification. The PA layer further includes functionality for ALE block encoder/decoder and thus the data link layer frame and the PACP frame can be encoded as ALE blocks, wherein an ALE block is a unit of data transmission under the ALE scheme.

Figure 10B:
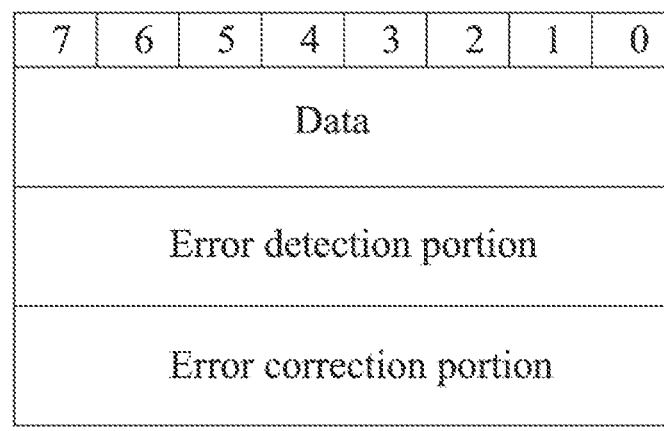
FIG. 10B is a diagram illustrating an embodiment of an ALE block.

FIG. 10B is a diagram illustrating an embodiment of an ALE block. As shown in FIG. 10B, an ALE block includes data, an error detection portion, and an error correction portion. The data may include one or more data link layer frames, or a PACP frame. The error detection portion may be error detection codes such as cyclic redundancy codes to protect the data. The error correction portion may be error correction codes such as forward error correction (FEC) codes to protect the data and the error detection portion.

Figure 11:
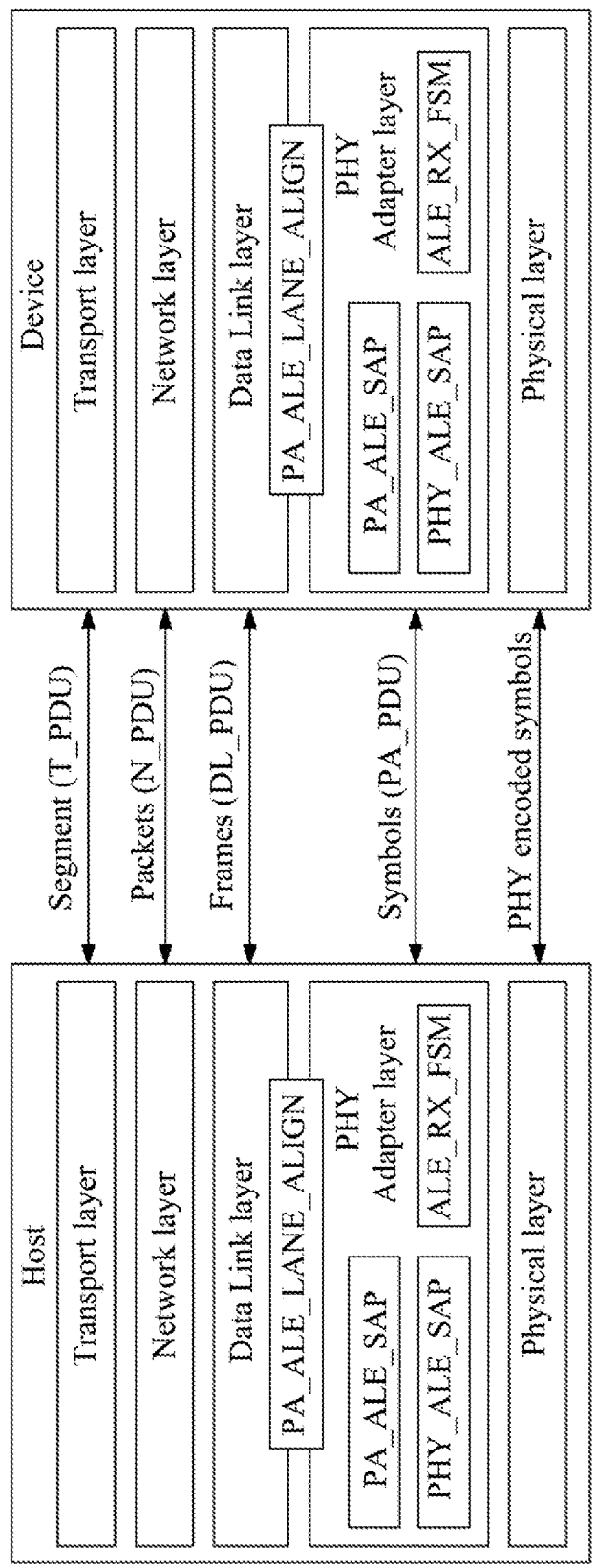
FIG. 11 is a schematic diagram illustrating another embodiment of a system capable of performing an ALE.

FIG. 11 is a schematic diagram illustrating another embodiment of a system capable of performing an advanced line encoding (ALE). As shown in FIG. 11, service access points (SAPs) in a modified UFS system are illustrated to implement an advanced line encoding (ALE) according to an embodiment of the present disclosure. In this embodiment as shown in FIG. 11, either the host or device of a modified UFS system has new service access points (SAPs) associated with the facilitation of ALE in the protocol stack. For example, a PHY Adapter (PA) service access point for ALE, denoted by PA_ALE_SAP, provides services in the PA layer and to the DL layer for data transfer for ALE. In addition, a service access point for PHY layer (e.g., M-PHY) with respect to ALE, denoted by PHY_ALE_SAP, provides services in the PA layer for association of the PA layer with PHY layer. A PA service access point for lane alignment for ALE, denoted by PA_ALE_LANE_ALIGN, provides services in the PA layer and to DL layer for generating a lane alignment pattern. Further, a finite state machine (FSM) for a receiver to support operations in the advanced line encoding mode, denoted by ALE_RX_FSM, is provided in the PA layer as shown in FIG. 11, for example. According to the embodiment of FIG. 11, the implementations of the modified PA layer and modified M-PHY with respect to the ALE can be hidden from the data link layer due to the use of PA_ALE_SAP. Thus, the DL frames, for example, in the format of the current UniPro specification, can be converted and then used in the generation of one or more units of data transmission (e.g., referred to as ALE blocks for this embodiment) in the ALE mode by using PA_ALE_SAP and PHY_ALE_SAP. Accordingly, the implementation complexity of the interconnection protocol with the ALE can be reduced.

As illustrated in FIG. 10A or FIG. 11, on one side (e.g., a host) of the communication system, the layers of the UniPro, such as the transport layer to PA layer, and the PHY layer communicate with their counterparts on the peer side (e.g., a device) by using their respective protocol data units (e.g., segments (T_PDU), packets (N_PDU), frames (DL_PDU), symbols (PA_PDU), and PHY encoded symbols), wherein the PA layer and PHY layer are configured to support the ALE. To implement an advanced line encoding, one or more blocks (e.g., ALE blocks), each regarded as a unit of data transmission in an ALE mode, are generated in the PA layer for transmission to a peer side, wherein each block includes a plurality of symbols or protocol data units (PDUs) from the DL or PA layer. In this regard, a communication system (e.g., the modified UFS system or a system based on the modified UniPro) in the advanced line encoding mode can be implemented according to the ALE related functionality such as those illustrated in FIG. 10A or the SAPs for data transfer such as those illustrated in FIG. 11, or other similar approach.

In addition, the following embodiments are provided for implementation of the interconnection protocol. In an embodiment, on the sending side, the ALE blocks are scrambled before being transmitted by the modified M-PHY for DC balance, and on the receiving side, corresponding received data is de-scrambled. The scrambling or de-scrambling operation can be implemented in the PA layer or physical layer of the interconnection protocol, for example.

In the advanced line encoding scheme, there is no K-Code (control symbols) of 8b/10b coding scheme serving for the receiver side to do symbol alignment and symbol lock operation as described in the conventional UniPro specification. In order to resolve symbol alignment and symbol lock issue in the ALE coding scheme, a lane alignment pattern is transmitted.

In some embodiments, the PA layer, for example, as indicated in FIG. 1, 9, 10A, 11 or so on, can be implemented to generate a lane alignment pattern in the ALE mode. The DL layer can trigger the PA layer to send a lane alignment pattern in the advanced line encoding mode for the counterpart of a peer side to do block alignment and lock operation. For example, the lane alignment pattern includes an ordered set pattern provided for lane alignment in the ALE mode. As an example, the ordered set pattern has a format as follows:

{Preamble bit, SKP_OS}+{Preamble bit, SDS_OS}, where SKP_OS stands for a skip ordered set and SDS_OS stands for a start of data stream ordered set. The first portion of the ordered set pattern, for example, {Preamble bit, {8{8'h00}}, {8{8'hFF}}}, can be a low frequency pattern that alternates between 32 0 s and 32 is and is not involved in scrambling. The PA receiver, for example, is implemented to use the first portion of the ordered set pattern for block alignment. The second portion of the ordered set pattern, for example, {Preamble bit, {4{8'hB1, {3{8'hC6}}}}}, is a special pattern which is not involved in scrambling. The PA receiver, for example, is implemented to determine whether the second portion of the ordered set pattern is properly received when a criterion with respect to the second portion is satisfied. In an example, where the second portion of the ordered set pattern has N (e.g., N=4) sets of a specific data pattern {8'hB1, {3{8'hC6}}} (i.e., {B1, C6, C6, C6}), a criterion may be made for the PA receiver as to whether there are M (e.g., M<N, such as M=3) or more than M sets of {B1, C6, C6, C6} are detected at the PA receiver. If the PA receiver using this criterion has detected M or more than M sets of {B1, C6, C6, C6}, the PA receiver determines that the second portion of the ordered set pattern is properly received. It is noted that the implementation of the lane alignment pattern is not limited to the examples. For example, SKP_OS can be set to {16{8'h99}}. In addition, SKP_OS or SDS_OS can be set to any appropriate ordered set. The preamble bit is optionally. When SKP_OS and SDS_OS are combined as a signaling event, the signaling event can be used to re-start a block alignment procedure and can be followed by data to be transmitted.

Figure 12:
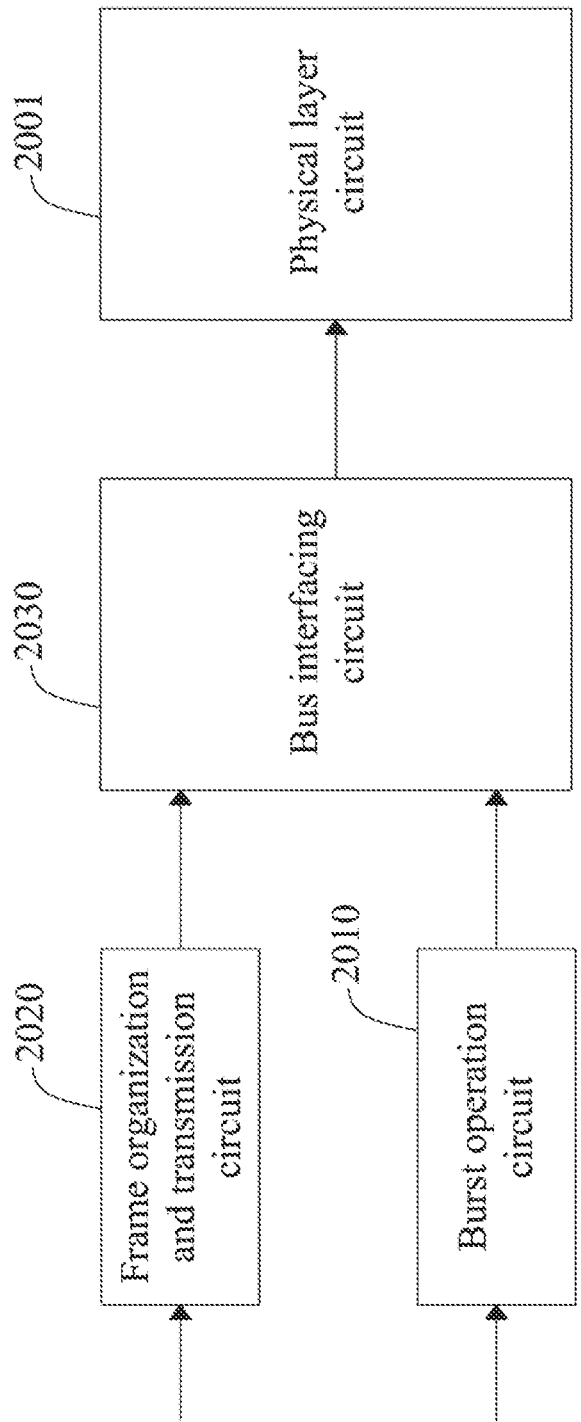
FIG. 12 is a block diagram illustrating a circuit architecture for facilitating implementation of error recovery with respect to a PA layer of the interconnection protocol with ALE according to an embodiment.

FIG. 12 illustrates a circuit architecture for facilitating implementation of error recovery with respect to a PA layer of the interconnection protocol with ALE according to an embodiment. The circuit architecture can be applied to a controller in FIG. 8A, 8B, or 8C for an electronic device (e.g., the first device 10 or second device 20 of one or more embodiments above) to facilitate implementation of error recovery in an ALE mode. As shown in FIG. 12, the circuit architecture includes a burst operation circuit 2010, a frame organization and transmission circuit 2020, and a bus interfacing circuit 2030. The burst operation circuit 2010 is implemented for managing burst and coupled to the bus interfacing circuit 2030 through a first bus. The frame organization and transmission circuit 2020 is implemented for preparing data for control frame transmission and coupled to the bus interfacing circuit 2030 through a second bus. The bus interfacing circuit 2030 is coupled to the burst operation circuit 2010 and the frame organization and transmission circuit 2020, for interfacing with a physical layer circuit 2001 for signal transmission. The physical layer circuit 2001, for example, is an interface circuit for implementing the physical layer of the interconnection protocol. The bus interfacing circuit 2030 is implemented to be electrically coupled to the physical layer circuit 2001, for example, in a manner compliant with a signaling interface required by the physical layer circuit 2001. For example, a signaling interface required by the physical layer circuit 2001 can be derived from a reference M-PHY module interface (RMMI) or other appropriate signaling interface.

The circuit architecture in FIG. 12 can be applied to a controller in FIG. 8A, FIG. 8B, or FIG. 8C to perform operations according to one or more of the embodiments of FIGS. 2 to 7 or related examples, whenever appropriate. The following provides embodiments in this regard.

In some embodiments, the circuit architecture in FIG. 12 can be applied to a controller in FIG. 8A, FIG. 8B, or FIG. 8C to perform operations according to the method in FIG. 3A or FIG. 5A. In these embodiments, the controller of the electronic device operates in an advanced line encoding mode and has a first burst from the electronic device to the other electronic device. The burst operation circuit 2010 can be implemented according to the operation S110 to close the first burst and then open a second burst from the electronic device to the other electronic device in response to a control signal for request frame transmission. The frame organization and transmission circuit 2020 can be implemented according to the operation S120 to transmit a request frame in the second burst in response to the control signal for request frame transmission. The burst operation circuit 2010 can be implemented according to the operation S130 to transmit a first lane alignment pattern in the second burst to the other electronic device when the controller of the electronic device does not receive a confirmation frame (e.g., PACP_PWR_cnf; PACP_SET_cnf or PACP_GET_cnf) from the other electronic device within a first time interval after the request frame (e.g., PACP_PWR_req; PACP_SE-T_req or PACP_GET_req) is transmitted. The frame organization and transmission circuit 2020 can be implemented according to the operation S140 to re-transmit the request frame in the second burst to the other electronic device after the first lane alignment pattern is transmitted. In this embodiment, the control signal can be received from an application layer or from a layer of the interconnection protocol on the local side, or can be an indication signal generated in the controller for preparing a request frame, for example.

Likewise, in some embodiments, the circuit architecture in FIG. 12 can be applied to a controller in FIG. 8A, FIG. 8B, or FIG. 8C to perform operations according to one or more embodiments or examples of the methods in FIG. 3A to FIG. 7, whenever appropriate. For the sake of brevity, the embodiments will not be repeated.

Figure 13:
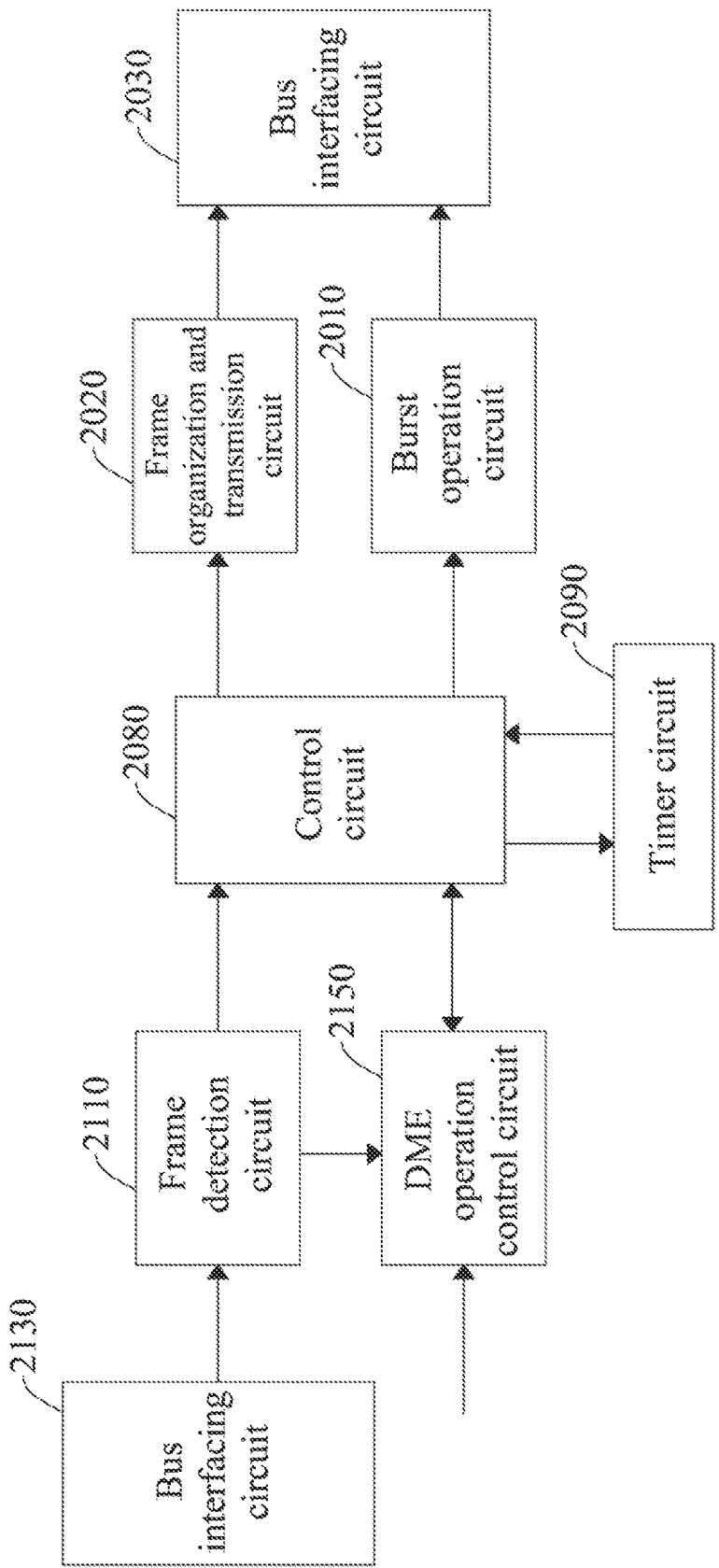
FIG. 13 is a schematic diagram illustrating circuit architectures for implementation of error recovery in an ALE mode with respect to PA layer of the interconnection protocol with ALE according to various embodiments.

FIG. 13 illustrates circuit architectures for implementation of error recovery in an ALE mode with respect to PA layer of the interconnection protocol with ALE according to various embodiments. A plurality of circuit architectures can be obtained according to FIG. 13 and each can be applied to a controller in FIG. 8A, 8B, or 8C for an electronic device (e.g., the first device 10 or second device 20 of one or more embodiments above) to facilitate implementation of error recovery in an ALE mode.

Referring in FIG. 13, in an embodiment, a circuit architecture is obtained on the basis of FIG. 12 and further includes a control circuit 2080 for frame transmission sequence. For example, the control circuit 2080 can be implemented to control frame transmission sequence with respect to PACP frames. The control circuit 2080 can output a control signal for PACP request frame transmission. The control signal, for example, represents or includes one or more signals to control (or trigger, select, or enable) the burst operation circuit 2010 or frame organization and transmission circuit 2020, or both of them, for PACP request frame transmission.

In an example, the control signal includes a burst control signal for PACP frame request transmission. In response to the burst control signal, the burst operation circuit 2010 can close a first burst by outputting a burst closing signal to the first bus and then open a second burst by outputting a burst opening signal to the first bus, sequentially, for example, according to the operation S110. The control signal can further include a PACP frame transmission request signal. In response to the PACP frame transmission request signal, the frame organization and transmission circuit 2020 can transmit a PACP request frame (e.g., PACP_PWR_req; PACP_SET_req or PACP_GET_req) in the second burst by outputting data of the PACP request frame to the second bus, for example, according to the operation S120.

In addition, when the controller of the electronic device does not receive a confirmation frame (e.g., PACP_PWR_cnf; PACP_SET_cnf or PACP_GET_cnf) from the other electronic device within a first time interval after the PACP request frame (e.g., PACP_PWR_req; PACP_SET_req or PACP_GET_req) is transmitted, the control circuit 2080 can further output a re-synchronization control signal, which is asserted for sending a lane alignment pattern. In response to the re-synchronization control signal, the burst operation circuit 2010 can transmit a lane alignment pattern in an opened burst to the other electronic device by outputting the lane alignment pattern to the first bus, for example, according to the operation S130. The control circuit 2080 can then output a PACP frame transmission request signal again. In response to the PACP frame transmission request signal, the frame organization and transmission circuit 2020 can re-transmit the request frame in the second burst by outputting data of the PACP request frame again to the second bus, for example, according to the operation S140. During the above operations of the examples, the bus interfacing circuit 2030 may receive the burst closing signal, burst opening signal, and PACP request frame, or further receive the first lane alignment pattern and re-transmitted PACP request frame, sequentially. The bus interfacing circuit 2030 accordingly provides signals compliant with a signaling interface between the bus interfacing circuit 2030 and the physical layer circuit 2001 such as a transmitter module (e.g., transmitter 1111 or 1211 shown in FIG. 9) of the physical layer circuit 2001. The transmitter module of the physical layer circuit 2001 performs the PACP request frame transmission accordingly in the ALE mode with a signaling scheme.

Referring in FIG. 13, in an embodiment, a circuit architecture is obtained on the basis of FIG. 12 and further includes the control circuit 2080 and a timer circuit 2090. The timer circuit 2090, for example, includes one or more timers that are configured to be set to respective time values. The control circuit 2080 can cooperate with the timer circuit 2090 for frame handshaking operation between the transmitting side and peer side. Taking the examples of the control circuit 2080 as exemplified above according to the method of FIG. 3A or FIG. 5A, whenever transmitting the PACP request frame (e.g., PACP_PWR_req; PACP_SET_req or PACP_GET_req), the controller of the electronic device can send a signal to activate the timer circuit 2090 to set a timer (e.g., a request timer) to a specific time value, e.g., the first time interval according to the operation S140. When the request timer expires, the timer circuit 2090 sends a signal indicating that the request timer is time-out. Likewise, the control circuit 2080 can cooperate with the timer circuit 2090 in similar or other operations for frame handshaking.

Referring in FIG. 13, in an embodiment, a circuit architecture is obtained on the basis of FIG. 12 and further includes the control circuit 2080, a frame detection circuit 2110, and a bus interfacing circuit 2130. The bus interfacing circuit 2130 can be implemented to be electrically coupled to the physical layer circuit 2001 such as a receiver module (e.g., receiver 1112 or 1212 shown in FIG. 9) of the physical layer circuit 2001. The bus interfacing circuit 2130 is coupled to the physical layer circuit 2001 in a manner compliant with a signaling interface required by the physical layer circuit 2001. For example, such a signaling interface can be derived from a reference M-PHY module interface (RMMI) or other appropriate signaling interface. The frame detection circuit 2110 is coupled to the bus interfacing circuit 2130 to receive data from the physical layer circuit 2001 and detect whether the data received is a PACP frame. When a PACP frame detected is a PACP confirmation frame (or a PACP request frame), the frame detection circuit 2110 sends, to the control circuit 2080, a signal indicating that a PACP confirmation frame (or a PACP request frame) is received. In response to the PACP confirmation frame (or a PACP request frame), the control circuit 2080 can perform operations according to a method based on any one or more embodiments of FIG. 3A to FIG. 7, for example.

Referring in FIG. 13, in an embodiment, a circuit architecture is obtained on the basis of FIG. 12 and further includes the control circuit 2080, the frame detection circuit 2110, the bus interfacing circuit 2130, and a DME operation control circuit 2150. For example, the DME operation control circuit 2150 can be implemented to perform control of DME control SAP operation, DME configuration SAP operation, or both of them. When receiving an activation request from a local DME control SAP or local DME configuration SAP, the DME operation control circuit 2150 sends an associated PACP request (or confirmation) operation request to the control circuit 2080.

Referring in FIG. 13, in an embodiment, a circuit architecture is obtained on the basis of FIG. 12 and further includes the control circuit 2080, timer circuit 2090, frame detection circuit 2110, bus interfacing circuit 2130, and DME operation control circuit 2150. The operations of this embodiment, for example, can be taken by combining one or more embodiments or examples above, whenever appropriate, to perform any embodiment of FIG. 3A to FIG. 7.

Figure 14:
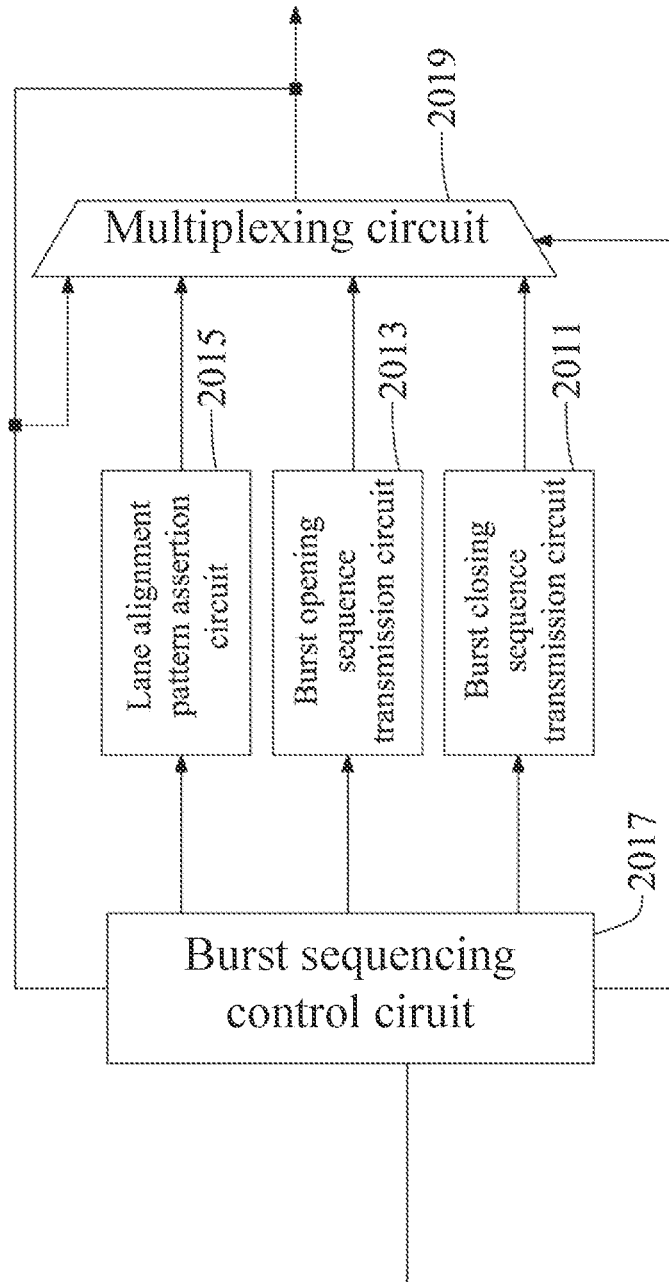
FIG. 14 is a block diagram illustrating an embodiment of a burst operation circuit of FIG. 12 or FIG. 13.

FIG. 14 illustrates an embodiment of a burst operation circuit of FIG. 12 or FIG. 13. As shown in FIG. 14, a burst operation circuit 2010A includes a burst closing sequence transmission circuit 2011, a burst opening sequence transmission circuit 2013, and a lane alignment pattern assertion circuit 2015. In response to a signal requesting a burst closing operation, the burst closing sequence transmission circuit 2011 outputs a burst closing signal to close an existing burst. In response to a signal requesting a burst opening operation, the burst opening sequence transmission circuit 2013 outputs a burst opening signal to open a new burst. In response to a signal requesting a re-synchronization operation, the lane alignment pattern assertion circuit 2015 outputs a lane alignment pattern.

The burst operation circuit 2010A can further include a burst sequencing control circuit 2017 to selectively control (e.g., select, enable, or trigger) the burst closing sequence transmission circuit 2011, burst opening sequence transmission circuit 2013, and a lane alignment pattern assertion circuit 2015, in response to a control signal for PACP request frame transmission. Taking the previous example of the control circuit 2080, a control signal for PACP request frame transmission is sent, including a burst control signal for PACP request frame. In response to the burst control signal, the burst sequencing control circuit 2017 can be implemented to output a signal requesting a burst closing operation to the burst closing sequence transmission circuit 2011 and output a signal requesting a burst opening operation to the burst opening sequence transmission circuit 2013. Accordingly, the burst closing sequence transmission circuit 2011 outputs a burst closing signal to close an existing burst and then the burst opening sequence transmission circuit 2013 outputs a burst opening signal to open a new burst. As such, the operation S110 can be implemented. Similarly, the operation S210 can be performed.

In addition, the control circuit 2080 can further send a PACP frame transmission request signal to the burst sequencing control circuit 2017. In response to the PACP frame transmission request signal, the burst sequencing control circuit 2017 can be implemented to output a signal requesting a re-synchronization operation to the lane alignment pattern assertion circuit 2015 to output a lane alignment pattern. As such, the operation S130 can be performed. Similarly, the operation S230 can be performed.

In addition, the burst operation circuit 2010A can further include a multiplexing circuit 2019. The multiplexing circuit 2019 can be implemented to select one of input signals that are output by the burst closing sequence transmission circuit 2011, burst opening sequence transmission circuit 2013, and lane alignment pattern assertion circuit 2015 respectively, according to an output selection signal. The burst sequencing control circuit 2017 can be implemented to output the output selection signal, according to the control of the burst operation circuit 2010A. For example, the burst sequencing control circuit 2017 can output an output selection signal indicating the selection of the output of the burst closing sequence transmission circuit 2011, burst opening sequence transmission circuit 2013, or lane alignment pattern assertion circuit 2015.

In the burst operation circuit 2010A, the burst sequencing control circuit 2017 and the multiplexing circuit 2019 are optional. In some embodiments of the burst operation circuit, the control circuit 2080 can be implemented to output a signal requesting a burst closing operation to the burst closing sequence transmission circuit 2011, a signal requesting a burst opening operation to the burst opening sequence transmission circuit 2013, or a signal requesting a re-synchronization operation to the lane alignment pattern assertion circuit 2015, selectively.

Figure 15:
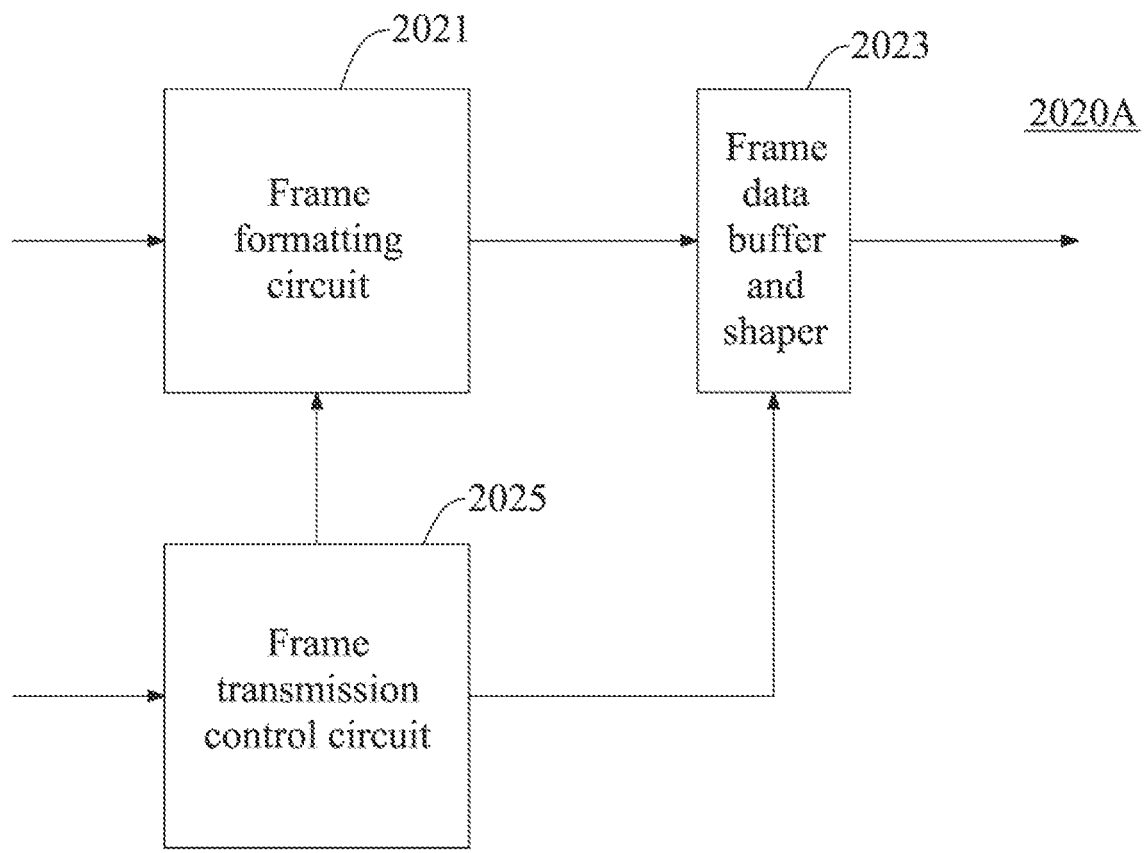
FIG. 15 is a block diagram illustrating an embodiment of a frame organization and transmission circuit of FIG. 12 or FIG. 13.

FIG. 15 illustrates an embodiment of a frame organization and transmission circuit of FIG. 12 or FIG. 13. As illustrated in FIG. 15, a frame organization and transmission circuit 2020A includes a frame formatting circuit 2021, a frame data buffer and shaper 2023, and a frame transmission control circuit 2025. The frame formatting circuit 2021 is configured to form PACP frames according to formats of a PACP frame type. The frame formatting circuit 2021 can be implemented for forming a PACP frame according to a frame type indication signal from the frame transmission control circuit 2025. The frame type indication signal indicates the type of a PACP frame to be formed. The type of a PACP frame can be a PACP request frame, such as PACP_PWR_req, PACP_SET_req, PACP_GET_req, or a PACP confirmation frame, such as PACP_PWR_cnf, PACP_SET_cnf, PACP_GET_cnf. The frame formatting circuit 2021 can be implemented to receive raw data used to output formatted PACP frames.

The frame data buffer and shaper 2023 is configured to receive the formatted PACP frames with a data buffer and to output data of the formatted PACP frames in a manner for the bus interfacing circuit 2030, such as a cycle-based PACP frame bus data.

The frame transmission control circuit 2025 is configured to control the frame formatting circuit 2021 and frame data buffer and shaper 2023 to output PACP frames. The frame transmission control circuit 2025 in response to the PACP frame transmission request signal from the control circuit 2080, for example, sends the frame type indication signal to the frame formatting circuit 2021. The frame transmission control circuit 2025 also sends a control signal to the frame data buffer and shaper 2023 to control the output of data of the formatted PACP frames.

Figure 16:
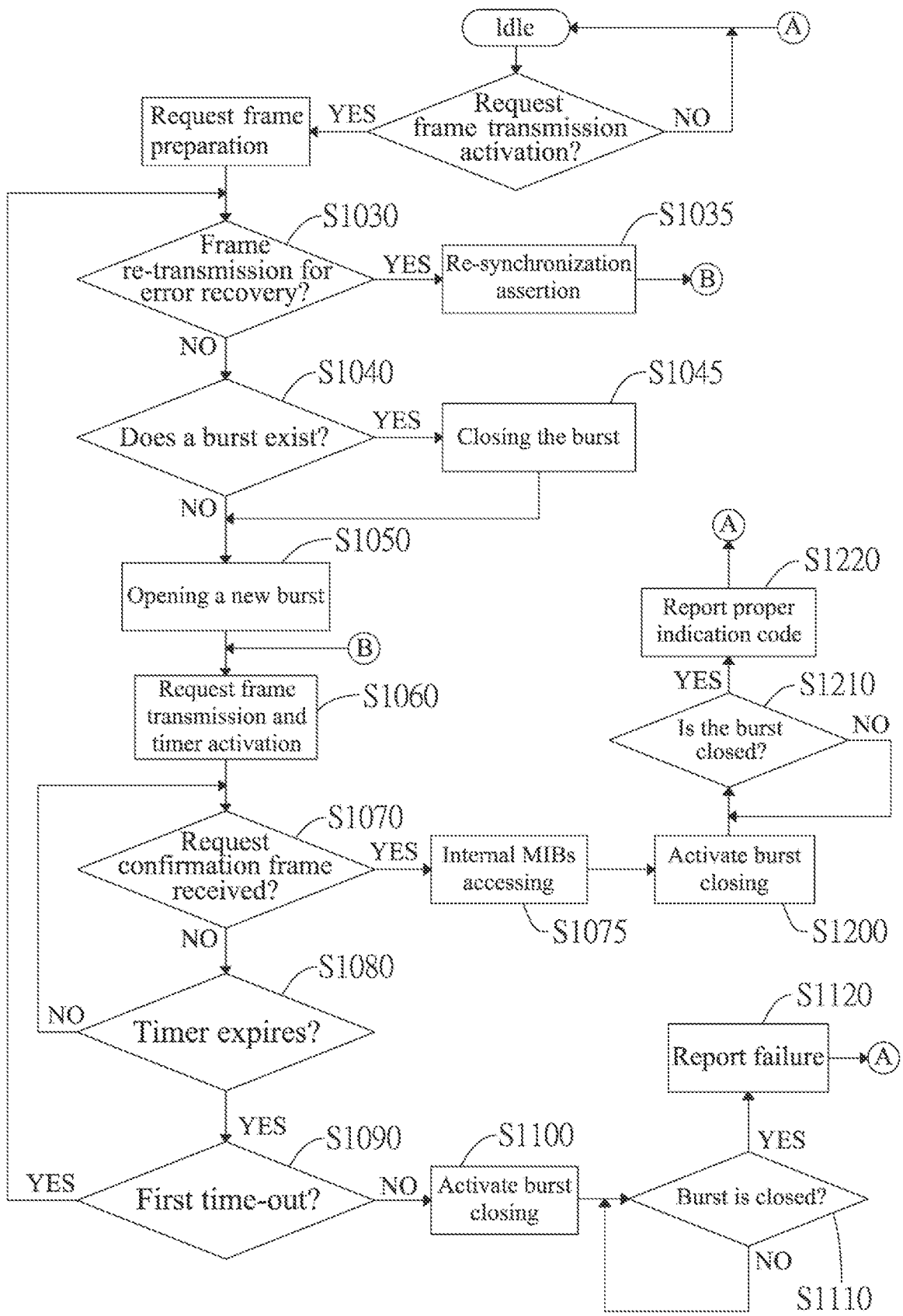
FIG. 16 is a flowchart illustrating an embodiment of a method for facilitating error recovery with respect to request frame transmission for power mode change.

FIG. 16 illustrates an embodiment of a method for facilitating error recovery with respect to request frame transmission for power mode change. The method of FIG. 16 can be used in the circuit architecture of FIG. 13, such as the control circuit 2080, for facilitating error recovery with respect to PACP request frame for power mode change.

In operation S1010, it is determined whether a PACP request frame transmission is activated, wherein the PACP request frame can be a power mode change request frame or a hibernation entering request frame. If so, PACP request frame preparation is performed in operation S1020; otherwise, the method returns to an idle state. In operation S1030, it is determined whether frame re-transmission for error recovery is needed. If so, operation S1035 is performed; otherwise operation S1040 is performed. In the operation S1035, a re-synchronization control signal is asserted for sending a lane alignment pattern (e.g., an ordered set pattern such as SKP_OS+SDS_OS), and then operation S1060 is performed. In the operation S1040, it is determined whether a burst has already opened (or a burst exists). If a burst exists, closing the burst is performed in operation S1045. If a burst does not exist, operation S1050 is performed. In the operation S1050, a new burst is opened. In operation S1060, a PACP request frame is transmitted and a PACP request timer is set. In operation S1070, it is determined whether a corresponding request confirmation frame is received. If so, operation S1075 is performed. If not, operation S1080 is performed. In the operation S1080, it is determined whether the PACP request timer expires. If so, operation S1090 is performed; otherwise, the method proceeds with the operation S1070. In the operation S1090, it is determined whether the expiration of the PACP request timer happens for the first time. If so, the method proceeds with the operation S1030; otherwise, operation S1100 is performed.

In the operation S1070, if a corresponding request confirmation frame is received, the operation S1075 is performed. In the operation S1075, internal MIBs accessing for power mode change or hibernation is performed. Then, operation S1200 is performed to activate burst closing, for example, sending a control signal to activate a signal requesting a burst closing operation. In operation S1210, it is determined whether the burst is closed. If the burst is closed, operation S1220 is performed and then the control circuit 2080 returns to the idle state. If the burst has not closed, the method proceeds with the operation S1210. In the operation S1220, a proper indication code according to the received PACP confirmation frame is reported to an upper layer (such as DL layer, DME or so on) and the PACP frame exchange is successful. According to the value of status field of the received PACP confirmation frame, the indication code reported to the upper layer may indicate, for example, the PACP request frame being accepted and executed, the PACP request frame being rejected due to concurrent access, or the PACP request frame being rejected due to capability mismatch, or so on.

On the other hand, when the expiration of the PACP request timer has happened for a number of times which is greater than a threshold value (e.g., 1), operation S1100 is performed. The operation S1100 is performed to activate burst closing, for example, sending a control signal to activate a signal requesting a burst closing operation. In operation S1110, it is determined whether the burst is closed. If the burst is closed, operation S1120 is performed to report that power mode change or hibernation entering fails and the control circuit 2080 returns to the idle state. If the burst has not closed, the method proceeds with the operation S1110.

As shown in FIG. 16, the operations S1045 and S1050 can be regarded as the operations of S110 of FIG. 3A or FIG. 5A.

Figure 17:
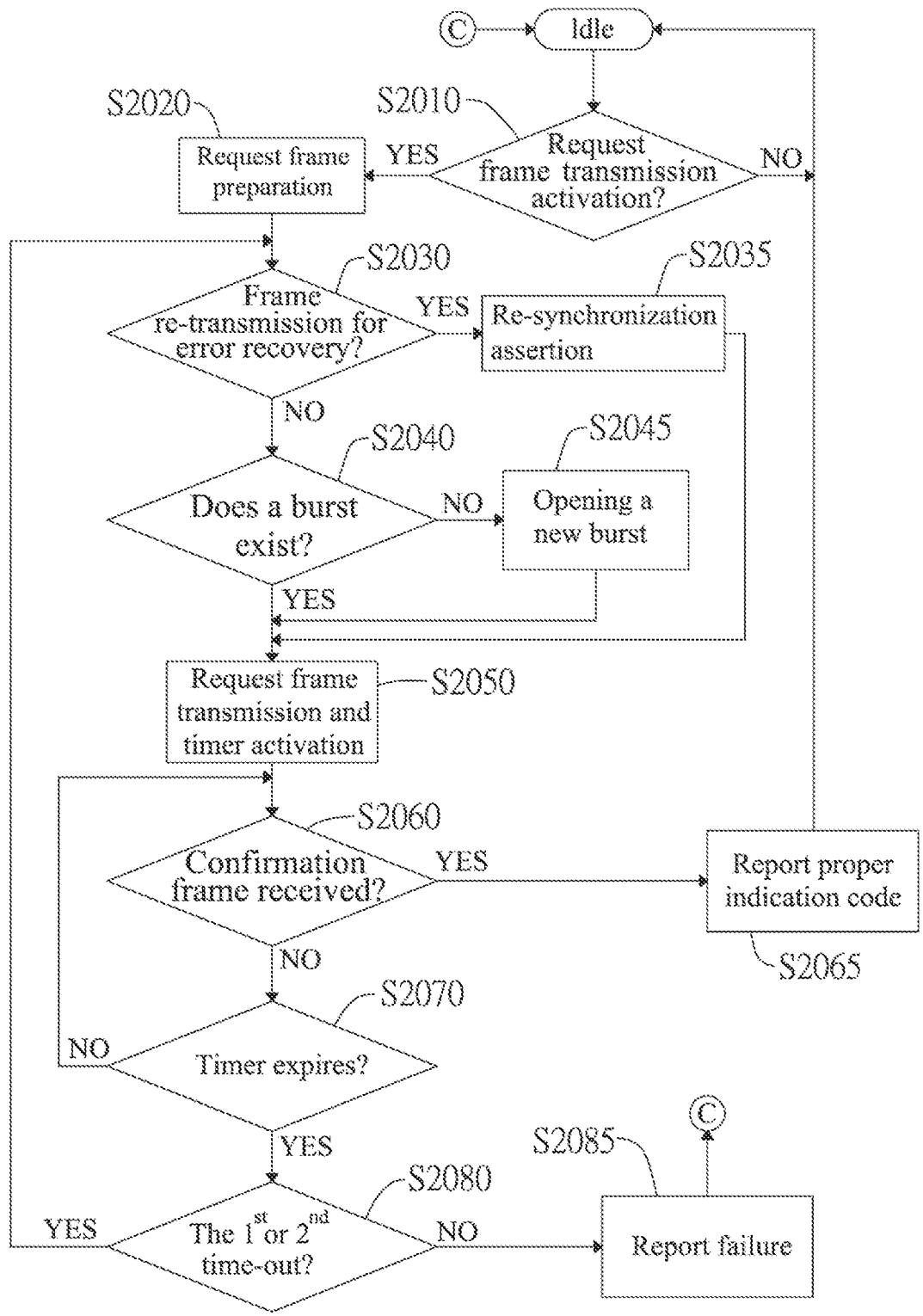
FIG. 17 is a flowchart illustrating an embodiment of a method for facilitating error recovery with respect to request frame transmission for attribute getting or setting.

FIG. 17 illustrates an embodiment of a method for facilitating error recovery with respect to request frame transmission for attribute getting or setting. The method of FIG. 17 can be used in the circuit architecture of FIG. 13, such as the control circuit 2080, for facilitating error recovery with respect to PACP request frame for attribute setting or getting.

In operation S2010, it is determined whether a PACP request frame transmission is activated, wherein the PACP request frame for attribute setting or getting on the peer side. If so, PACP request frame preparation is performed in operation S2020; otherwise, the method returns to an idle state. In operation S2030, it is determined whether frame re-transmission for error recovery is needed. If so, operation S2035 is performed; otherwise operation S2040 is performed. In the operation S2035, a re-synchronization control signal is asserted for sending a lane alignment pattern (e.g., an ordered set pattern such as SKP_OS+SDS_OS), and then operation S2050 is performed. In the operation S2040, it is determined whether a burst has already opened (or a burst exists). If a burst exists, operation S2050 is performed. If a burst does not exist, operation S2045 is performed. In the operation S2045, a new burst is opened. In the operation S2050, a PACP request frame is transmitted and a PACP request timer is set. In operation S2060, it is determined whether a corresponding request confirmation frame is received. If so, operation S2065 is performed and the control circuit 2080 returns to the idle state. In the operation S2065, a proper indication code according to the received PACP confirmation frame is reported to an upper layer and the PACP frame exchange is successful. According to the value of status field of the received PACP confirmation frame (e.g., parameter "ConfigResultCode" of its status field), the indication code reported to the upper layer may indicate success or other status, for example, the PACP request frame being accepted and executed, the PACP request frame being rejected due to request not valid for a target MIB attribute, or so on. If a corresponding request confirmation frame is not received, operation S2070 is performed. In the operation S2070, it is determined whether the PACP request timer expires. If so, operation S2080 is performed; otherwise, the method proceeds with the operation S2060. In the operation S2080, it is determined whether the expiration of the PACP request timer has happened for a number of times which is less than or equal to a threshold value (e.g., 2). If so, the method proceeds with the operation S2030; otherwise, operation S2085 is performed to report that PACP frame request for attribute setting or getting fails and the control circuit 2080 returns to the idle state.

Figure 18:
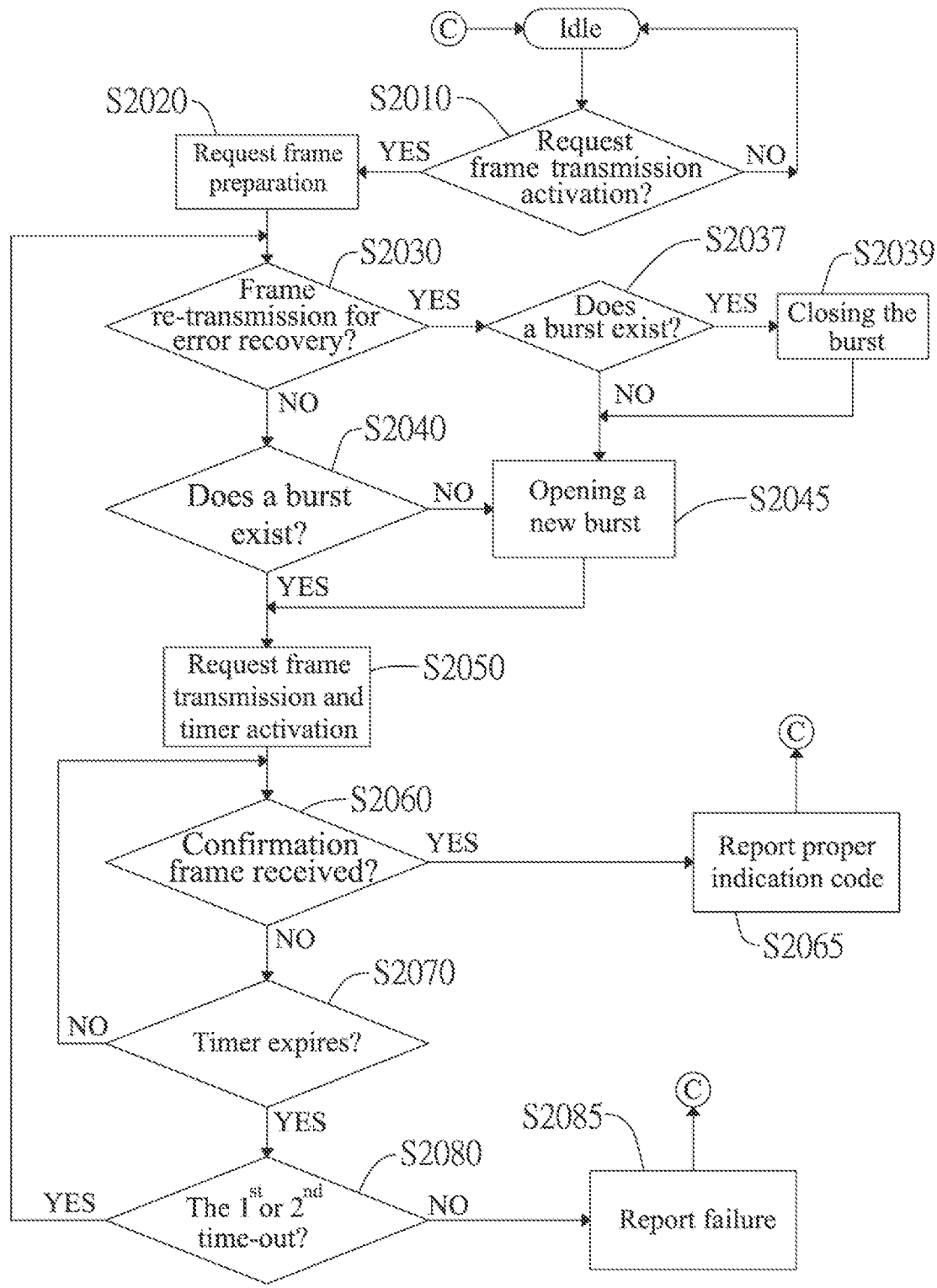
FIG. 18 is a flowchart illustrating another embodiment of a method for facilitating error recovery with respect to request frame transmission for attribute getting or setting.

FIG. 18 illustrates another embodiment of a method for facilitating error recovery with respect to request frame transmission for attribute getting or setting. The method of FIG. 18 can be used in the circuit architecture of FIG. 13, such as the control circuit 2080, for facilitating error recovery with respect to PACP request frame for attribute setting or getting.

The main differences between the embodiment of FIG. 18 and that of FIG. 17 are the operations for enhancing reliability of request frame re-transmission for error recovery. In the embodiment of FIG. 17, the operation S2035 is performed to assert a re-synchronization control signal for sending a lane alignment pattern when it is determined that frame re-transmission for error recovery is needed in the operation S2030, and then the operation S2050 is performed to transmit the PACP request frame in the existing burst. These operations of FIG. 17 are obtained according to the operations S130 and S140 of FIG. 5A. Unlike the embodiment of FIG. 17, the embodiment of FIG. 18 performs operation S2037 when it is determined that frame re-transmission for error recovery is needed in the operation S2030. Referring to FIG. 18, in the operation S2037, it is determined whether there is a burst opened (or a burst exists). If there is a burst opened, operation S2039 is performed. If a burst does not exist, operation S2045 is performed. In the operation S2039, the opened (or existing) burst is closed, and then the operation S2045 is performed to open a new burst. After that, the operation S2050 is performed to transmit a PACP request frame and set a PACP request timer, wherein the PACP request frame is transmitted in the new burst. These operations of FIG. 18 are obtained according to the operations S130A and S140A of FIG. 5C. The other operations of FIG. 18 are similar to those of FIG. 17 and will not be repeated for the sake of brevity.

Figure 19:
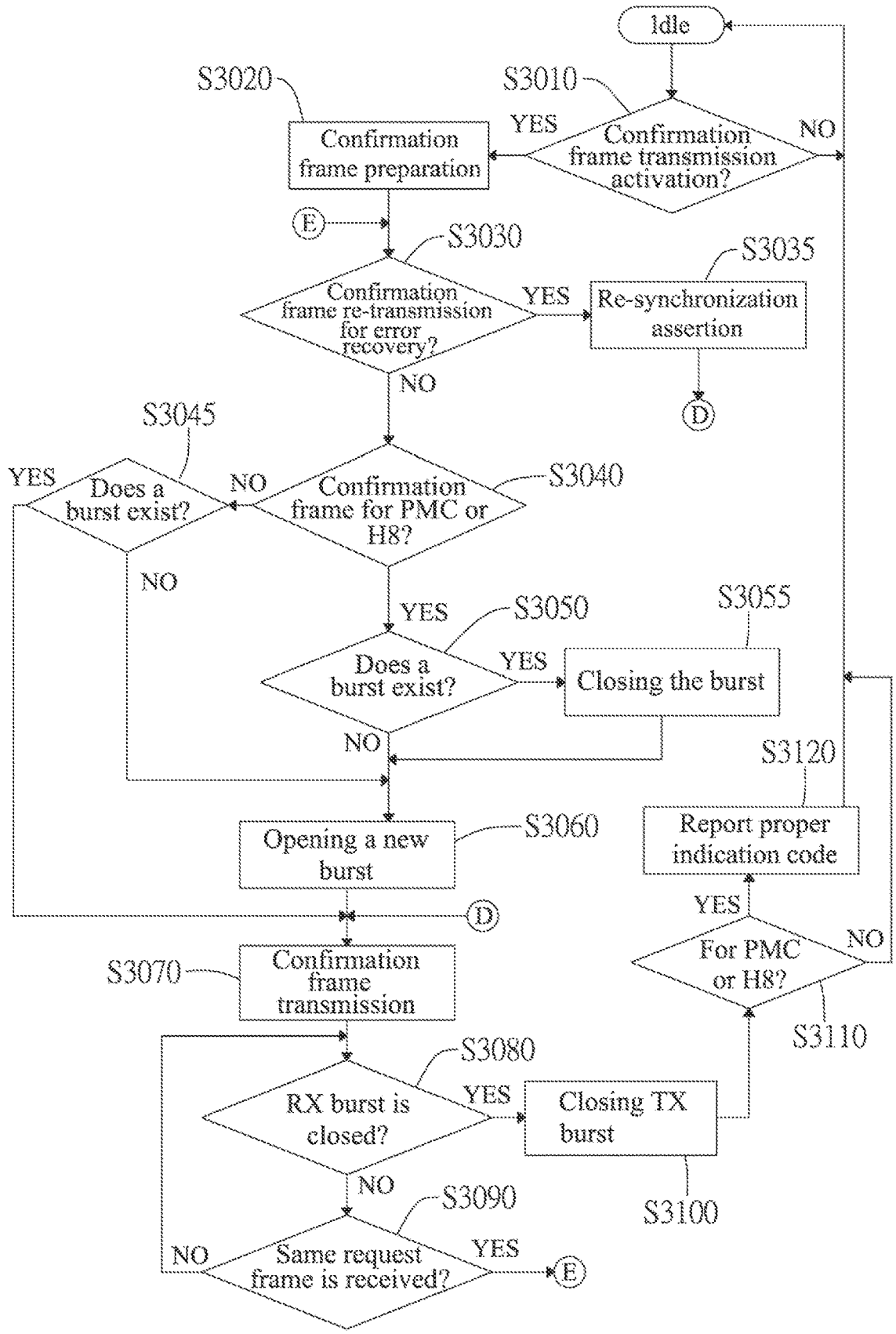
FIG. 19 is a flowchart illustrating an embodiment of a method for facilitating error recovery with respect to confirmation frame transmission.

FIG. 19 illustrates an embodiment of a method for facilitating error recovery with respect to confirmation frame transmission. The method of FIG. 19 can be used in the circuit architecture of FIG. 13, such as the control circuit 2080, for facilitating error recovery with respect to PACP confirmation frame.

In operation S3010, it is determined whether a PACP confirmation frame transmission is activated, wherein the PACP confirmation frame can be PACP_PWR_cnf, PACP_SET_cnf, or PACP_GET_cnf. If so, PACP confirmation frame preparation is performed in operation S3020; otherwise, the method returns to an idle state. After the operation S3020, operation S3030 is performed to determine whether confirmation frame re-transmission for error recovery is needed. If so, operation S3035 is performed; otherwise operation S3040 is performed. In the operation S3035, a re-synchronization control signal is asserted for sending a lane alignment pattern (e.g., an ordered set pattern such as SKP_OS+SDS_OS), and then operation S3070 is performed. In the operation S3040, it is determined whether transmission of a confirmation frame with respect to the received PACP request frame for power mode change (PMC) or hibernation (e.g., denoted by H8) entering is needed. If it is determined that transmission of a confirmation frame with respect to the received PACP request frame for power mode change or hibernation entering is needed, operation S3050 is performed. Otherwise, it indicates that transmission of a confirmation frame with respect to the received PACP request frame for other purpose such as attribute getting or setting is needed, and then operation S3045 is performed. In the operation S3045, it is determined whether a burst has already opened (or a burst exists). If so, the operation S3070 is performed; otherwise operation S3060 is performed. In the operation S3050, it is determined whether a burst has already opened (or a burst exists). If a burst exists, operation S3055 is performed to close the burst.

If a burst does not exist, operation S3060 is performed. In the operation S3060, a new burst is opened. In the operation S3070, a PACP confirmation frame is transmitted. After the operation S3070, operation S3080 is performed.

In the operation S3080, it is determined whether the burst (or called "inbound" burst) from a peer side to the local side (denoted by "RX burst") is closed. If the burst from the peer side to the local side is closed, operation S3100 is performed to close the burst (or called "outbound" burst) from the local side to the peer side (denoted by "TX burst"). If the burst from the peer side to the local side ("RX burst") has not closed, operation S3090 is performed. In the operation S3090, it is determined whether the same PACP request frame is received. If so, the method proceeds with the operation S3030; otherwise, the method proceeds with the operation S3080.

After the operation S3100, operation S3110 is performed. In the operation S3110, it is determined whether the received PACP request frame is for power mode change (PMC) or hibernation (e.g., denoted by H8) entering. If so, operation S3120 is performed and then the control circuit 2080 returns to the idle state. If not, the method returns to the idle state. In the operation S3120, a proper indication code according to the received PACP confirmation frame is reported to an upper layer. According to the value of status field of the received PACP confirmation frame (e.g., parameter "PowerChangeResultCode" of its status field according to the UniPro specification), the indication code reported to the upper layer may indicate success or other status. For example, if the PA layer of the peer side determines that the received PACP request frame for power mode change (PMC) or hibernation (H8) entering is invalid for the capability supported by the peer side, the peer side will send the PACP confirmation frame with its status field set to PWR_ERROR_CAP to the local side. If the PACP frame exchange is successfully eventually at the peer side, the PWR_ERROR_CAP will be the indication code reported to its upper layer.

Figure 20:
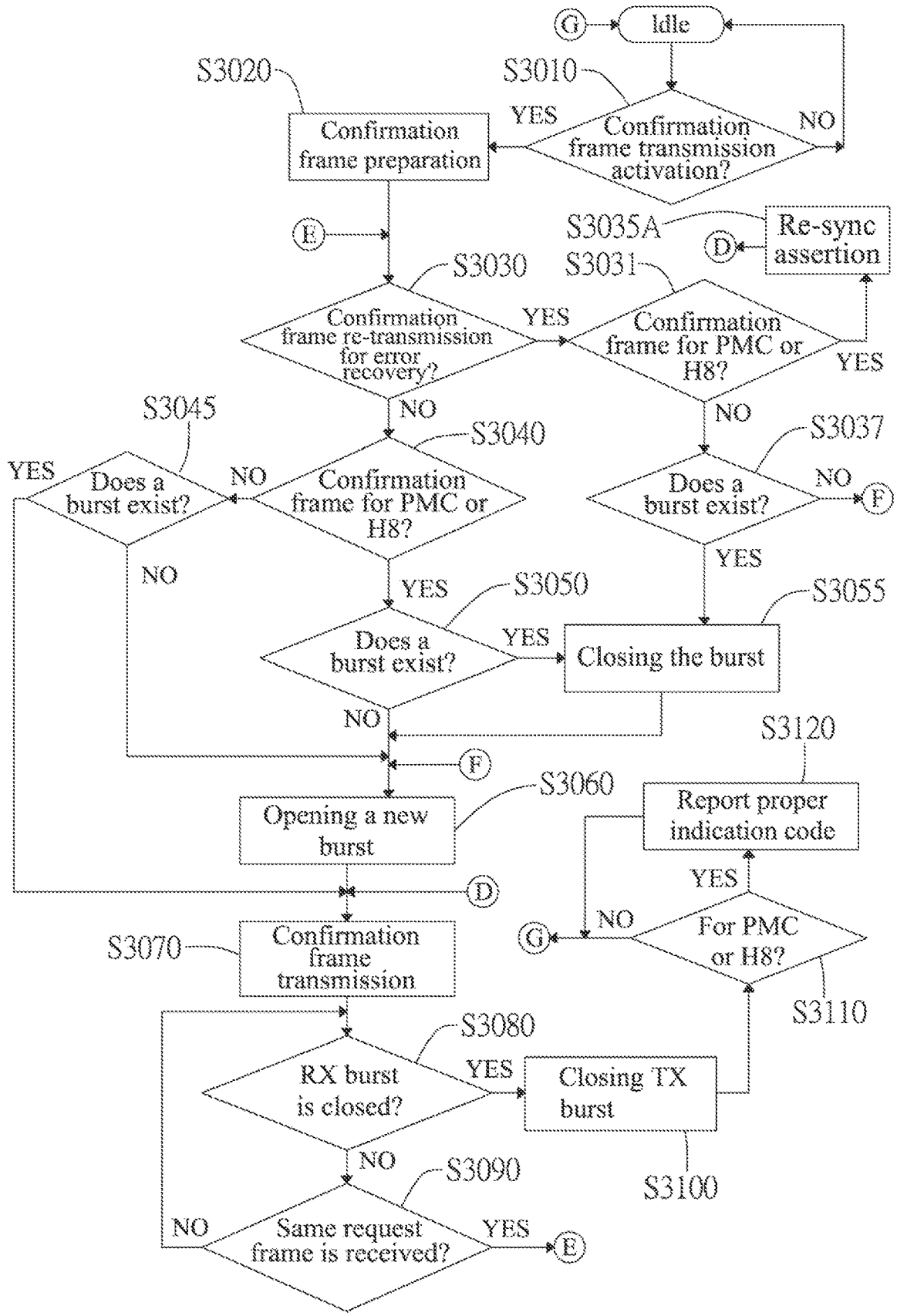
FIG. 20 is a flowchart illustrating another embodiment of a method for facilitating error recovery with respect to confirmation frame transmission.

FIG. 20 illustrates another embodiment of a method for facilitating error recovery with respect to confirmation frame transmission. The method of FIG. 20 can be used in the circuit architecture of FIG. 13, such as the control circuit 2080, for facilitating error recovery with respect to PACP confirmation frame.

The main differences between the embodiment of FIG. 20 and that of FIG. 19 are the operations for enhancing reliability of confirmation frame re-transmission for error recovery. In the embodiment of FIG. 19, the operation S3035 is performed to assert a re-synchronization control signal for sending a lane alignment pattern when it is determined that confirmation frame re-transmission for error recovery is needed in the operation S3030 and then the operation S3070 is performed to transmit the PACP confirmation frame in the existing burst. These operations of FIG. 19 can be obtained according to the operations S230 and S240 of FIG. 5B. Unlike the embodiment of FIG. 19, the embodiment of FIG. 20 performs operation S3031 when it is determined that confirmation frame re-transmission for error recovery is needed in the operation S3030. Referring to FIG. 20, in the operation S3031, it is determined whether transmission of a confirmation frame for the received PACP request frame for power mode change (PMC) or hibernation (e.g., denoted by H8) entering is needed. If it is determined that transmission of a confirmation frame for the received PACP request frame for power mode change or hibernation entering is needed, operation S3035A is performed to assert a re-synchronization control signal for sending a lane alignment pattern. Otherwise, it indicates that a confirmation frame for the received PACP request frame for other purpose such as attribute getting or setting is needed, and then operation S3037 is performed. In the operation S3037, it is determined whether there is a burst opened (or a burst exists). If there is a burst opened, operation S3055 is performed to close the opened (or existing) burst and then the operation S3060 is performed to open a new burst. If there is no existing burst, operation S3060 is performed. After that, the operation S3070 is performed to transmit a PACP confirmation frame, which is transmitted in the new burst. These operations (e.g., S3055, S3060, and S3070) of FIG. 20 for re-transmission of confirmation frame for the received PACP request frame for other purpose such as attribute getting or setting can be obtained according to the operations S230A and S240A of FIG. 5D. The other operations of FIG. 20 (such as operation S3035A and so on) are similar to those of FIG. 19 and will not be repeated for the sake of brevity.

In some embodiments, an advanced line encoding mode of the interconnection protocol (e.g., based on UniPro and M-PHY) can be implemented in a burst state such as in a burst state dedicated for the ALE mode or in a high-speed burst state (e.g., based on HS-BURST as described in the M-PHY specification). After a transmitter module and a corresponding receiver module for the physical layer in a first device and a second device enter the burst state, the effective data transmission from or to an associated upper layer ("link layer" such as a UniPro layer) can be performed. For example, in the advanced line encoding mode, ALE blocks (or ALE frames), which are units of data transmission for the advanced line encoding mode, can be generated based on the PACP frames or DL frames and transmitted in a burst.

Figure 21:
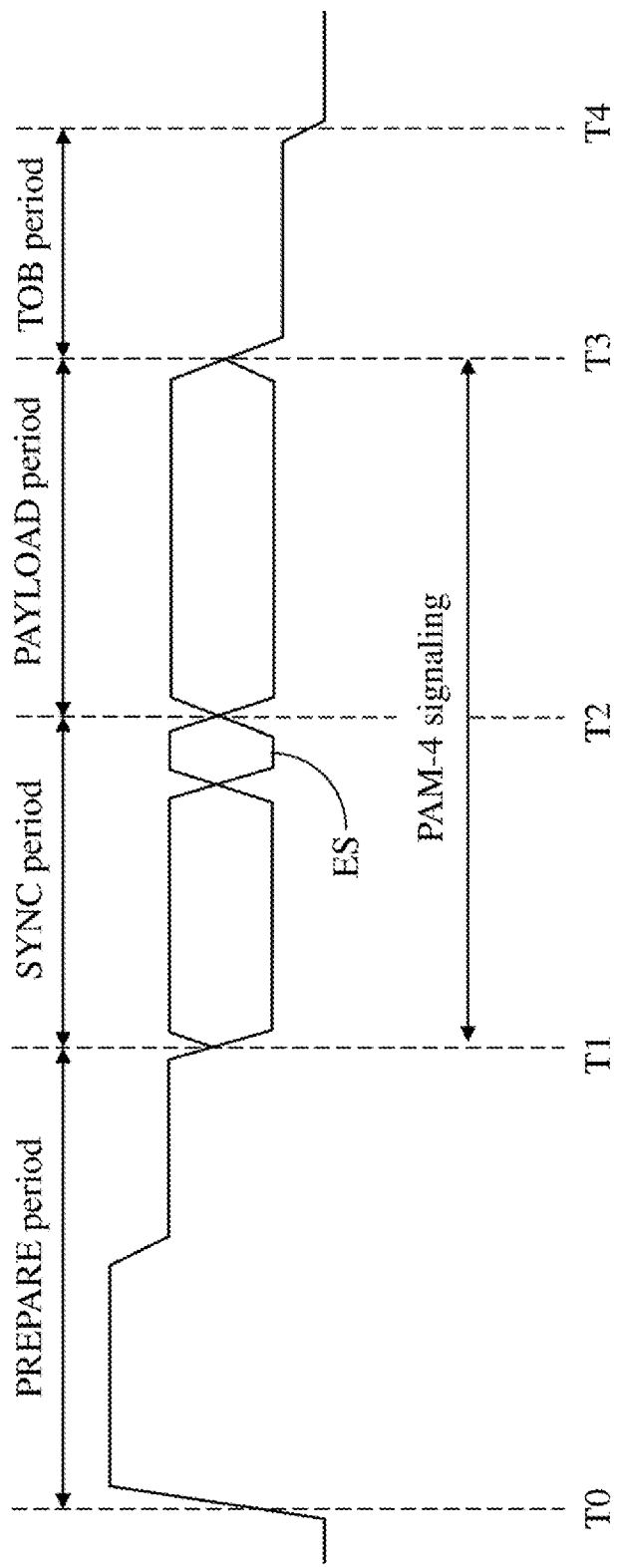
FIG. 21 is a timing diagram illustrating an embodiment of operations of a burst state of a transmitter module of an electronic device.

For example, the burst state includes several sub-states such as a prepare (PREPARE) state, a synchronization (SYNC) state, a payload (PAYLOAD) state, and a tail-of-burst (TOB) state. FIG. 21 is a timing diagram illustrating an embodiment of operations of a burst state of a transmitter module of an electronic device (e.g., first device 10 or second device 20). In this embodiment, the transmitter module is configured to provide line termination during the burst state, which can be illustrated in FIG. 21 by the signal level changes during the PREPARE state and (exit-to-) a power saving state.

In the PREPARE state, the transmitter module of the physical layer of the electronic device (e.g., first device 10 (or second device 20)) drives a line (e.g., a pair of data lines Din (or a pair of data lines Dout)) for a lane with a specific data pattern or signal level pattern (e.g., a positive differential voltage such as DIF-P as described in the M-PHY specification) for a specified time interval (e.g., a PREPARE period between time points T0 and T1 as illustrated in FIG. 21). When an associated receiver module of another electronic device (e.g., second device 20 (or first device 10)) on the lane detects the specific signal level pattern (e.g., DIF-P), the receiver module will wake up or enable associated logic circuit or modules (such as phase lock loop (PLL), termination, and so on).

In the SYNC state, the transmitter module transmits a specific data pattern or signal level pattern for a specified time interval (e.g., a SYNC period between time points T1 and T2 as illustrated in FIG. 21) so as to perform signal alignment and lock operation. In the SYNC state, the specific data pattern or signal level pattern may be transmitted by using a signaling scheme (e.g., PAM-n, n>2 such as PAM-4) adopted in the ALE mode. The associated receiver module can take advantage of this kind of the pattern to lock its timing logic module (e.g., PLL and so on).

In the PAYLOAD state, the transmitter module transmits data, such as ordered sets, ALE block (or called ALE frame) or so on, during a PAYLOAD period as illustrated in FIG. 21. In the PAYLOAD state, the data are transmitted by using a signaling scheme (e.g., PAM-n, n>2, such as PAM-4) adopted in the ALE mode. The associated receiver module can pass received data, such as PACP frame, DL frames, or so on to an upper layer such as PA layer, DL layer, or so on.

In the TOB state, the transmitter module drives the line (e.g., a pair of data lines Din (or a pair of data lines Dout)) on the lane with a specific data pattern or signal level pattern (e.g., DIF-N as described in the M-PHY specification or other patterns) for a specified time interval (e.g., a TOB period between time points T3 and T4 as illustrated in FIG. 21) to indicate the ending of the current burst state. After the associated receiver module detects the TOB, the receiver module can exit the burst state and return a power saving state (e.g., a SAVE state as described in the M-PHY specification).

In some embodiments of the interconnection protocol, the physical layer can be further implemented with an enhanced signaling scheme such as a pulse amplitude modulation (PAM) n-level (n>2). In an example, PAM-4 is used as the enhanced signaling scheme. A voltage of a line (e.g., a pair of data lines Din or a pair of data lines Dout, as illustrated in FIG. 8A) on a lane may be driven in a DIF-P state (a line state) with a positive differential line voltage, a DIF-N state with a negative differential line voltage, or a DIF-Z state with an almost zero differential line voltage. The line may have states other than the DIF-N or DIF-P state, such as a DIF-Q state indicating a high-impedance state. In this example, the differential line voltage may be described as a value obtained by subtracting the voltage level of one of a pair of data lines connected to a negative node of a transmitter module (or receiver module) from the voltage level of another of the pair of data lines connected to a positive node of the transmitter module (or receiver module). In PAM-4, there are four line states indicating four pairs of two-bit data, i.e., 00, 01, 10, 11, respectively. For example, the DIF-N state can be used to indicate the data {00} of PAM-4, the DIF-P state can be used to indicate the data {11} of PAM-4. In addition, a line state associated with a differential line voltage between the positive and negative differential line voltages can be used to indicate the data {10} of PAM-4 and another line state associated with another differential line voltage between the positive and negative differential line voltages can be used to indicate the data {01} of PAM-4. In another example, the four pairs of two-bit data of PAM-4 can also be associated with four line states in another order, such as an ordering of Gray code or so on, whenever appropriate.

Regarding the above sub-states of a burst state, it is optionally that during the SYNC state, only some levels of the PAM-4 signaling levels are used to simplify implementation of signaling detection, such as using only the DIF-N and DIF-P states that indicate {00} and {11} respectively. In an example, a specific pattern (e.g., an MARKER0 (MK0) described in M-PHY specification or other data pattern), as indicated by "ES" in FIG. 21, can be used in the SYNC state to indicate the end of SYNC period. In the PAYLOAD state, for example, the four levels of PAM-4 signaling scheme can be used to indicate data, such as an ordered set, ALE blocks, or so on.

As mentioned in the above embodiments, closing a burst and opening a new burst are performed in order to enhance reliability of PACP frame error recovery. Regarding closing (or ending) a burst, a "burst end" operation is performed in an embodiment. In the burst end operation, a plurality of symbols indicating trailing (or called trailing symbols) can be transmitted for a time interval based on a unit of data transmission for an ALE mode. For example, the trailing symbols are transmitted lastly during the PAYLOAD period illustrated in FIG. 21. Taking the above ALE blocks as an example, the unit of data transmission for an ALE mode is an ALE block so that the time interval can be set to a plurality of clock cycles corresponding to at least one or more ALE blocks. The trailing symbols can facilitate the receiving side for the burst to obtain sufficient received signals to serve as clock signals used on the receiving side for handling the last ALE block.

Regarding opening a burst, in an embodiment, a lane alignment pattern, for example, an ordered set pattern such as SKP_OS+SDS_OS, can be transmitted (e.g., during the PAYLOAD period illustrated in FIG. 21) as an opening sequence to open a burst and informs the receiving side that a burst is opened and ready for block alignment with the lane alignment pattern.

In the present disclosure, "asserting" a signal (or other alternative forms such as "asserted" or "assertion") means that a signal is set to be in an active state, which may be an active voltage level in a high or low level, or may be a signal in an associated form. "De-asserting" a signal (or other alternative forms such as "de-asserted" or "de-assertion") means that a signal is set to be in an inactive state, which may be an inactive voltage level in a low or high level, or may be a signal in another associated form. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

As described above, various embodiments of a method for an interconnection protocol capable of performing an advanced line coding, a controller, and an electronic device (such as a host or a storage device) are provided.

The present disclosure is described by way of the multiple embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method of control protocol frame transmission by an electronic device, the method comprising:
- after transmitting a first burst to a second electronic device and in response to a control signal that requests frame transmission, outputting, to the second electronic device, a burst closing signal to close the first burst and outputting, to the second electronic device, a burst opening signal to open a second burst;
- in response to the control signal, transmitting, to the second electronic device, a request frame in the second burst to request frame transmission;
- wherein the electronic device is configured to operate in an advanced line encoding mode and is configured to transmit data using an advanced line encoding having an effective data rate larger than an effective data rate of 8b/10b encoding.

2. The method according to claim 1, wherein the method further comprises:
- by the electronic device, in response to the electronic device not receiving a confirmation frame from the second electronic device within a first time interval after the request frame is transmitted, transmitting a first lane alignment pattern in the second burst to the second electronic device to request frame re-transmission; and
- by the electronic device, re-transmitting the request frame in the second burst to the second electronic device after the first lane alignment pattern is transmitted.

3. The method according to claim 1, wherein the request frame is a power mode change request frame.

4. The method according to claim 1, wherein the request frame is a peer device attribute getting request frame or a peer device attribute setting request frame.

5. The method according to claim 4, wherein the method further comprises:
- by the electronic device, in response to the electronic device not receiving a confirmation frame from the second electronic device within a first time interval after the request frame is transmitted, closing the second burst and opening a third burst from the electronic device to the second electronic device for request frame re-transmission; and
- by the electronic device, re-transmitting the request frame in the third burst to the second electronic device.

6. The method according to claim 1, wherein the advanced line encoding is based on a 1b/1b line encoding, 128b/129b line encoding, 128b/130b line encoding, 128b/132b line encoding, 256b/257b line encoding, 256b/258b line encoding, or 256b/260b line encoding.

7. The method according to claim 1, wherein the electronic device is configured to perform the advanced line encoding mode in conjunction with signal transmission using a signaling scheme of a pulse amplitude modulation (PAM) n-level, wherein n is an integer greater than two.

8. An electronic device comprising:
a controller including:
a physical layer circuit for signal transmission;
a link controller coupled to the physical layer circuit;
a burst operation circuit configured to, after transmitting a first burst from the electronic device to a second electronic device and in response to receiving a control signal to request frame transmission, output, to the second electronic device, a burst closing signal to close the first burst and output, to the second electronic device, a burst opening signal to open the second burst; and
a frame organization and transmission circuit configured to transmit a request frame in the second burst in response to the control signal to request frame transmission;
wherein the electronic device is configured to operate in the advanced line encoding mode and is configured to transmit data using an advanced line encoding having an effective data rate larger than an effective data rate of 8b/10b encoding.

9. The electronic device according to claim 8, wherein the controller is configured to, when not receiving a confirmation frame from the second electronic device within a first time interval after transmitting the request frame, transmit a first lane alignment pattern in the second burst to the second electronic device, and re-transmit the request frame in the second burst to the second electronic device after transmitting the first lane alignment pattern.

10. The electronic device according to claim 8, wherein the request frame is a power mode change request frame.

11. The electronic device according to claim 8, wherein the request frame is a peer device attribute getting request frame or a peer device attribute setting request frame.

12. The electronic device according to claim 11, wherein the controller is configured to, when not receiving a confirmation frame from the second electronic device within a first time interval after the request frame is transmitted, close the second burst, open a third burst from the electronic device to the second electronic device for request frame re-transmission, and re-transmit the request frame in the third burst to the second electronic device.

13. The electronic device according to claim 8, wherein the advanced line encoding is based on a 1b/1b line encoding, 128b/129b line encoding, 128b/130b line encoding, 128b/132b line encoding, 256b/257b line encoding, 256b/258b line encoding, or 256b/260b line encoding.

14. The electronic device according to claim 8, wherein the electronic device is configured to perform the advanced line encoding mode in conjunction with signal transmission using a signaling scheme of a pulse amplitude modulation (PAM) n-level, wherein n is an integer greater than 2.

15. An electronic device comprising:
a controller including:
a physical layer circuit for signal transmission;
a link controller coupled to the physical layer circuit;
a burst operation circuit configured to, after transmitting a first burst from the electronic device to a second electronic device and in response to receiving a request frame from the second electronic device, output, to the second electronic device, a burst closing signal to close the first burst and output, to the second electronic device, a burst opening signal to open the second burst; and
a frame organization and transmission circuit configured to transmit, to the second electronic device, a confirmation frame in the second burst;
wherein the electronic device is configured to operate in the advanced line encoding mode and is configured to transmit data using an advanced line encoding having an effective data rate larger than an effective data rate of 8b/10b encoding.

16. The electronic device according to claim 15, wherein the controller is configured to, when receiving the request frame from the second electronic device again after transmitting the confirmation frame, transmit a first lane alignment pattern in the second burst to the second electronic device, and re-transmit the confirmation frame in the second burst to the second electronic device after transmitting the first lane alignment pattern.

17. The electronic device according to claim 15, wherein the request frame is a power mode change request frame.

18. The electronic device according to claim 15, wherein the request frame is a peer device attribute getting request frame or a peer device attribute setting request frame.

19. The electronic device according to claim 18, wherein the controller is configured to, when receiving the request frame from the second electronic device again after transmitting the confirmation frame, close the second burst, open a third burst from the electronic device to the second electronic device for confirmation frame re-transmission, and re-transmit the confirmation frame in the third burst to the second electronic device.

* * * * *